(12) United States Patent
Lee et al.

(10) Patent No.: US 10,365,888 B2
(45) Date of Patent: Jul. 30, 2019

(54) MOBILE TERMINAL WITH MICROPHONE CONFIGURED TO RECEIVE EXTERNAL INPUT INCLUDING VIBRATION OF AIR AND METHOD FOR CONTROLLING THE SAME IN RESPONSE TO EXTERNAL INPUT

(71) Applicant: LG ELECTRONICS INC., Seoul (KR)

(72) Inventors: Chulhee Lee, Seoul (KR); Kyungah Lim, Seoul (KR); Sehee Kim, Seoul (KR); Youseok Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 404 days.

(21) Appl. No.: 15/136,807

(22) Filed: Apr. 22, 2016

(65) Prior Publication Data

US 2017/0003934 A1 Jan. 5, 2017

(30) Foreign Application Priority Data

Jul. 1, 2015 (KR) .......................... 10-2015-0094125

(51) Int. Cl.
*G06F 3/048* (2013.01)
*G06F 3/16* (2006.01)
(Continued)

(52) U.S. Cl.
CPC .............. *G06F 3/167* (2013.01); *G06F 3/011* (2013.01); *G06F 3/017* (2013.01); *G06F 3/0346* (2013.01);
(Continued)

(58) Field of Classification Search
CPC ........ G06F 3/0482; G06F 3/167; G06F 3/017; G06F 3/04883; G06F 3/0481; G06F 3/04812; G06F 3/04817
See application file for complete search history.

(56) References Cited

U.S. PATENT DOCUMENTS

| 9,384,290 B1* | 7/2016 | Liu | ...................... G06F 17/3087 |
| 2010/0185945 A1* | 7/2010 | Yang | .................. H04M 1/72569 715/700 |

(Continued)

FOREIGN PATENT DOCUMENTS

| EP | 2680553 | 1/2014 |
| WO | 2015020284 | 2/2015 |

OTHER PUBLICATIONS

European Patent Application No. 16001327.2, Extended Search Report dated Nov. 22, 2016, 8 pages.

*Primary Examiner* — Phuong H Nguyen
(74) *Attorney, Agent, or Firm* — Lee, Hong, Degerman, Kang & Waimey

(57) ABSTRACT

A mobile terminal may activate a specific mode on the basis of an external input received through a microphone activated on the basis of a specific condition. The mobile terminal includes a terminal body, a microphone disposed on the terminal body and configured to receive an input outside of the terminal body, a sensor configured to sense a movement of the terminal body, and a controller configured to activate the microphone on the basis of a specific movement of the terminal body sensed by the sensor, and activate a specific mode when the input outside of the terminal body received through the activate microphone corresponds to a change in vibration of air having a preset pattern.

17 Claims, 19 Drawing Sheets

(51) Int. Cl.
    *G06F 3/01*      (2006.01)
    *G06F 3/0346*    (2013.01)
    *G06F 3/0484*    (2013.01)
    *G06F 3/0488*    (2013.01)

(52) U.S. Cl.
    CPC ...... *G06F 3/04845* (2013.01); *G06F 3/04883* (2013.01); *G06F 2203/0381* (2013.01); *G06F 2203/04804* (2013.01)

(56) References Cited

U.S. PATENT DOCUMENTS

| | | | |
|---|---|---|---|
| 2010/0227640 A1* | 9/2010 | Kim | H04M 19/04 455/550.1 |
| 2011/0018825 A1* | 1/2011 | Kondo | G06F 3/0433 345/173 |
| 2011/0153323 A1* | 6/2011 | Kim | G10L 15/22 704/235 |
| 2011/0271194 A1* | 11/2011 | Lin | G06Q 30/0241 715/728 |
| 2012/0075462 A1* | 3/2012 | Chen | G06F 3/011 348/135 |
| 2013/0293589 A1* | 11/2013 | Hwang | G06F 3/0488 345/666 |
| 2014/0115695 A1* | 4/2014 | Fadell | G06F 21/316 726/19 |
| 2014/0379341 A1 | 12/2014 | Seo et al. | |

* cited by examiner

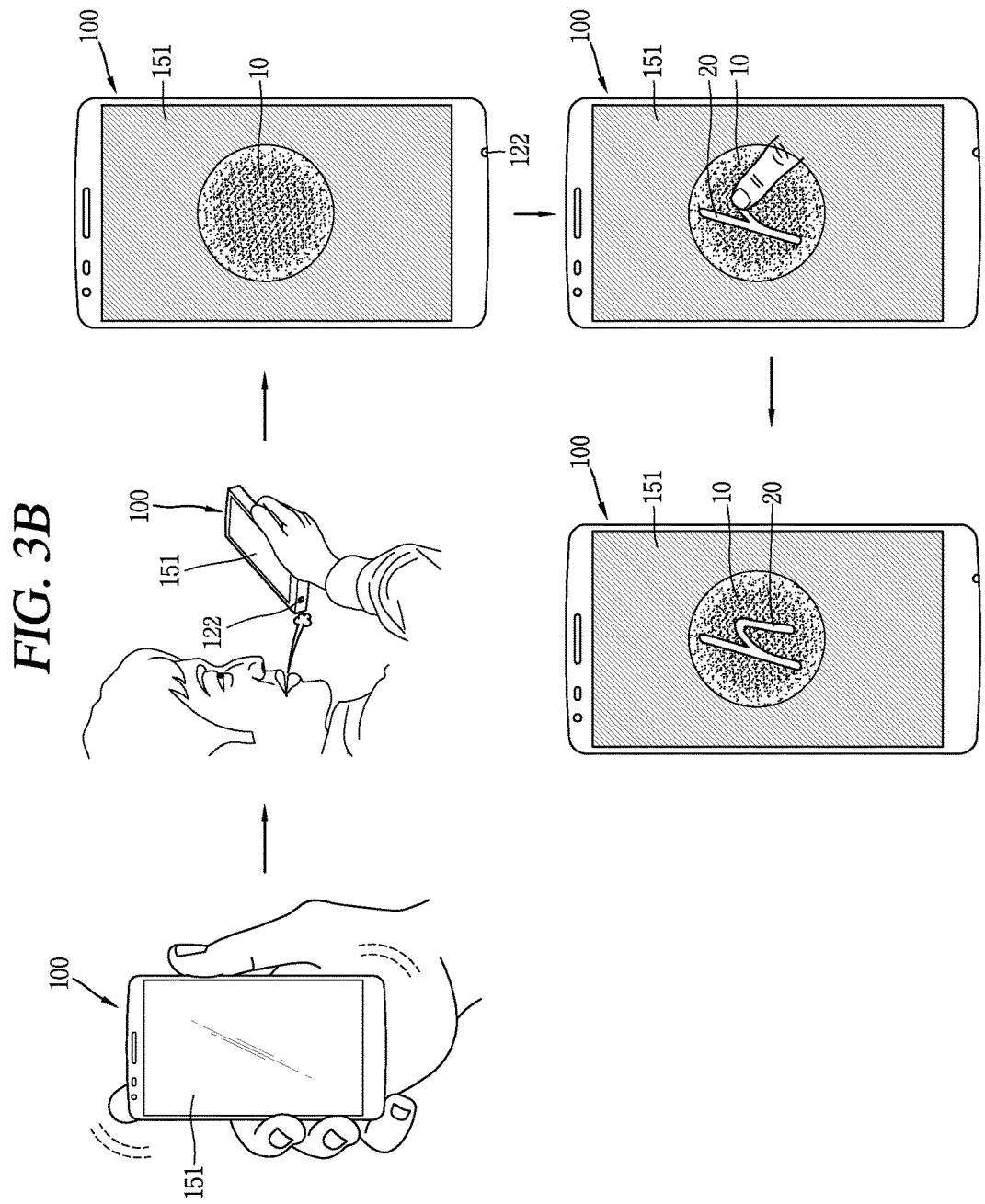

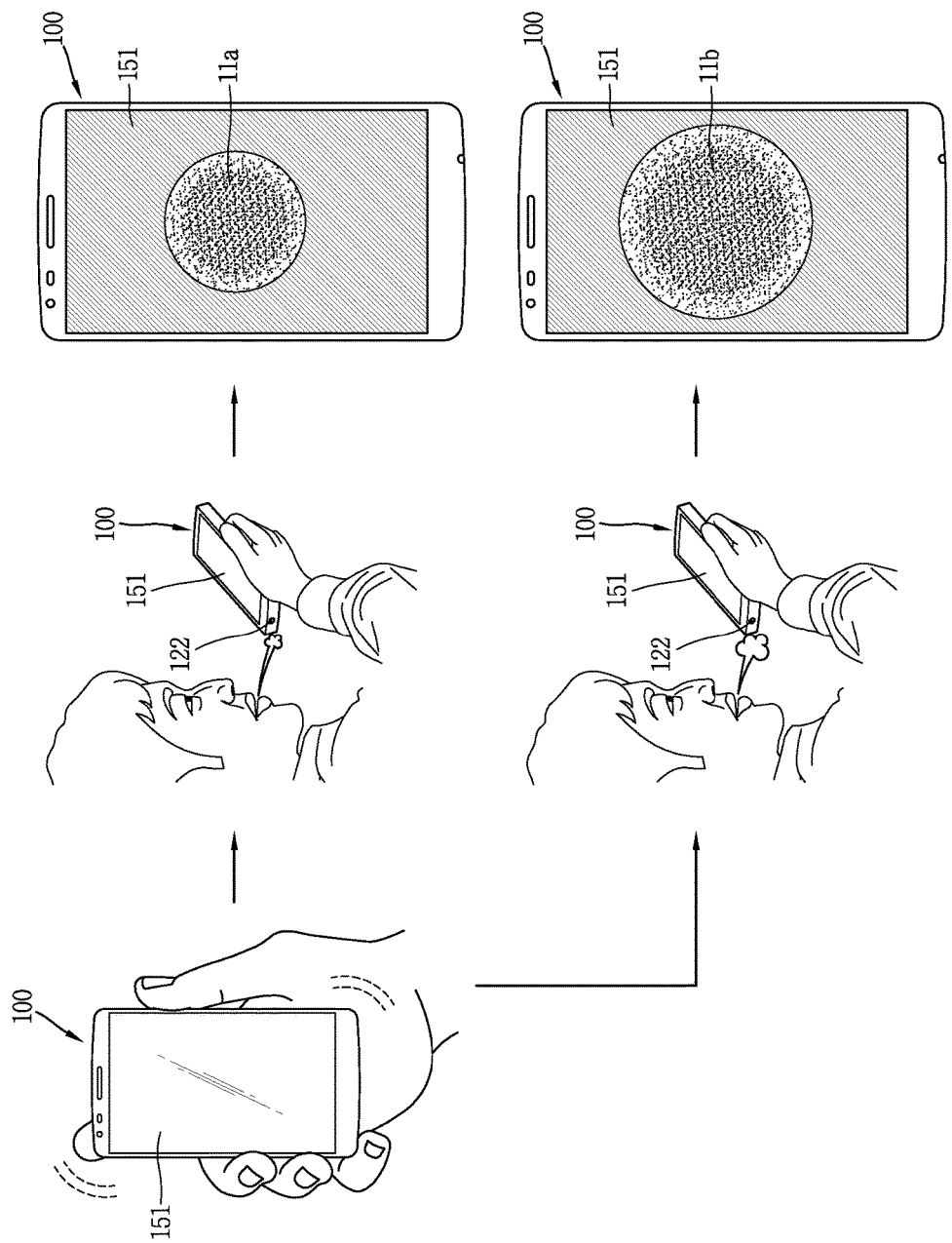

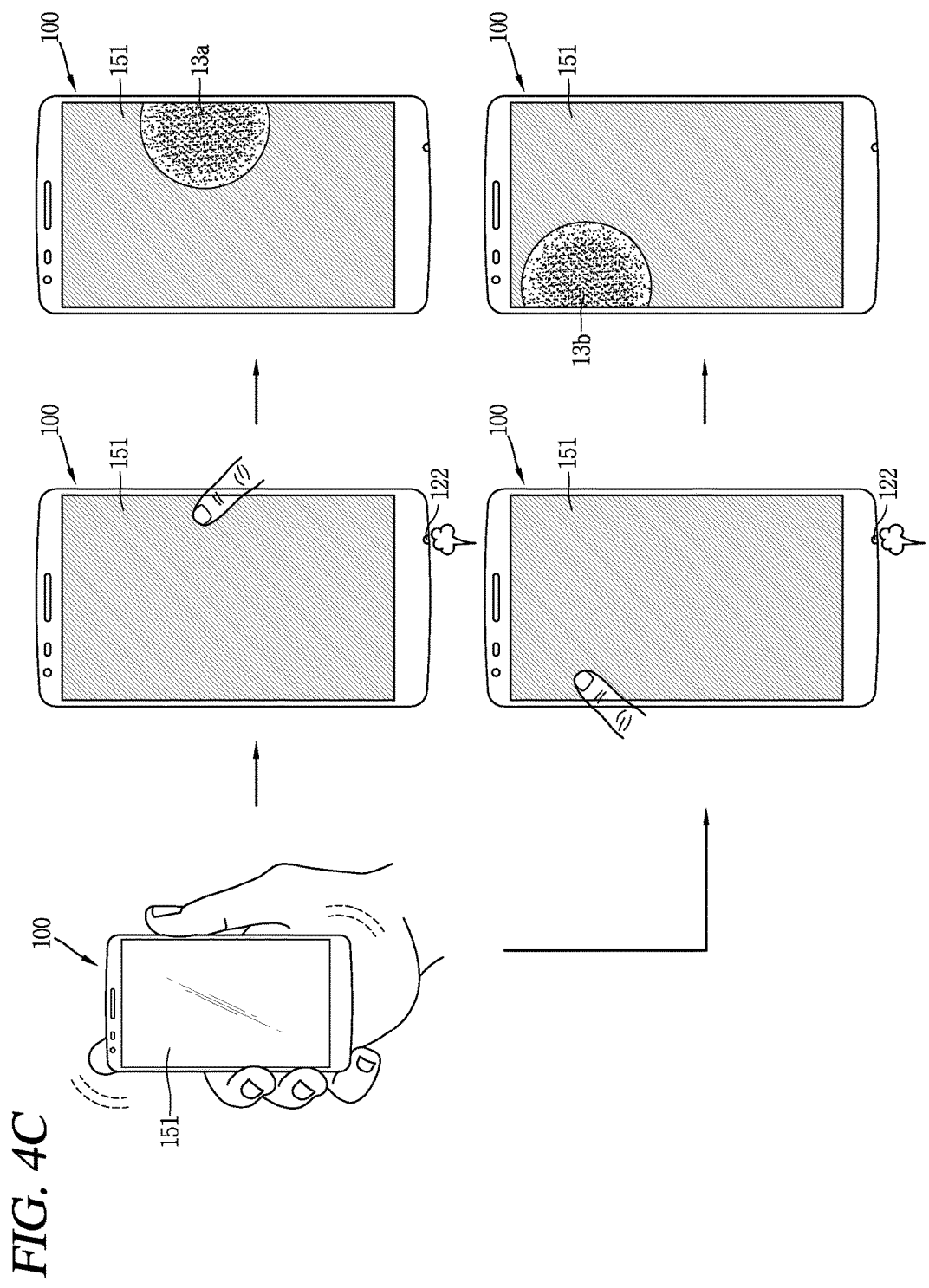

MOBILE TERMINAL WITH MICROPHONE CONFIGURED TO RECEIVE EXTERNAL INPUT INCLUDING VIBRATION OF AIR AND METHOD FOR CONTROLLING THE SAME IN RESPONSE TO EXTERNAL INPUT

CROSS-REFERENCE TO RELATED APPLICATION

Pursuant to 35 U.S.C. § 119(a), this application claims the benefit of earlier filing date and right of priority to Korean Application No. 10-2015-0094125, filed on Jul. 1, 2015, the contents of which is incorporated by reference herein in its entirety.

BACKGROUND OF THE INVENTION

1. Field of the Invention

The present disclosure relates to a mobile terminal capable of executing a mode in which input is received, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

In order to support and increase functions of terminals, improvement of structural parts and/or software parts of terminals may be taken into consideration.

Also, a microphone may be installed in the main body of the mobile terminal and may receive various inputs so that a user may execute functions conveniently. For example, the microphone may receive a user's voice input, and the mobile terminal according to an exemplary embodiment of the present disclosure may provide a voice recognition function of executing a function corresponding to the voice input.

Meanwhile, research has been conducted to provide a more convenient interface environment to users by utilizing various inputs received through the microphone, in addition to the voice input.

SUMMARY OF THE INVENTION

Therefore, an aspect of the detailed description is to provide a mobile terminal capable of executing a specific mode in response to a preset external input received by a microphone activated in a specific manner, and a method for controlling the same.

To achieve these and other advantages and in accordance with the purpose of this specification, as embodied and broadly described herein, a mobile terminal may include: a terminal body; a microphone installed in the terminal body and configured to receive an input outside of the terminal body; a sensor configured to sense a movement of the terminal body; and a controller configured to activate the microphone on the basis of a specific movement of the terminal body sensed by the, and activate a specific mode when the input outside of the terminal body received through the activate microphone corresponds to a change in vibration of air having a preset pattern.

In an embodiment of the present disclosure, the mobile terminal may further include: a touch screen installed in the terminal body and configured to receive a touch input, wherein the specific mode may be a mode in which information formed by at least one of a touch input applied to the touch screen and a voice input received through the microphone is received.

In an embodiment of the present disclosure, the specific mode may be maintained in an activated state for a preset period of time, and the controller may control the touch screen such that a preset input screen able to display the formed information is output on at least a portion of the touch screen on the basis of the activation of the specific mode.

In an embodiment of the present disclosure, when the touch screen is in a deactivated state in which lighting is turned off, the controller may activate the specific mode, while switching at least a portion of the touch screen to an activated state.

In an embodiment of the present disclosure, the controller may control the touch screen such that at least one of a size and transparency of the preset input screen is changed over time, and when the preset period of time has lapsed, the controller may control the touch screen such that outputting of the preset input screen is terminated.

In an embodiment of the present disclosure, when a specific input is received through the microphone before the preset period of time has lapsed, the controller may control the touch screen such that outputting of the preset input screen is maintained for the preset period of time starting from a point in time at which the specific input is received.

In an embodiment of the present disclosure, when the formed information is displayed on the preset input screen, the controller may store image information corresponding to at least a portion of the preset input screen when a preset condition is met before outputting of the preset input screen is terminated.

In an embodiment of the present disclosure, the preset condition may be related to at least one of reception of a specific input through the microphone, a lapse of the preset period of time, and sensing of a specific movement of the terminal body by the sensor.

In an embodiment of the present disclosure, when the image information is output on the touch screen on the basis of an output request from the user, the controller may control the touch screen such that outputting of the image information is terminated when the preset period of time has lapsed.

In an embodiment of the present disclosure, when the image information is specific image information stored together with preset authentication information, the controller may limit outputting of a portion of the specific image information, and when a specific input is received through the microphone, the controller may control the touch screen such that the other remaining portion of the specific image information is output.

In an embodiment of the present disclosure, the controller may determine an output size of the preset input screen on the basis of at least one of a degree of a change in vibration of air corresponding to an input outside of the terminal body and a time duration in which an input outside of the terminal body is received.

In an embodiment of the present disclosure, when an input outside of the terminal body is received in a state in which a touch is applied to one point of the touch screen, the controller may control the touch screen such that the preset input screen is output at a position corresponding to the one point on the touch screen.

In an embodiment of the present disclosure, when screen information is output on the touch screen, the controller may control the touch screen such that the preset input screen having preset transparency is output on at least a portion of the screen information in an overlapping manner.

In an embodiment of the present disclosure, when the formed information is displayed on the preset input screen, the controller may control the touch screen such that transparency of the portion in which the formed information is displayed is changed.

In an embodiment of the present disclosure, when a preset type of first user input is received, the controller may store image information corresponding to the preset input screen, when a preset type of second user input is received, the controller may store image information corresponding to the preset input screen and at least a portion of the screen information, and the first and second user inputs may be received by at least one of the microphone, the touch screen, and the sensor.

To achieve these and other advantages and in accordance with the purpose of this specification, as embodied and broadly described herein, a method for controlling a mobile terminal may include: sensing a movement of a terminal body; when the movement of the terminal body is sensed as a specific movement, activating a microphone installed in the terminal body; and when an input outside of the terminal body received through the activated microphone corresponds to a change in vibration of air having a preset pattern, activating the specific mode.

In an embodiment of the present disclosure, the specific mode may be a mode in which information formed by at least one of a touch input applied to a touch screen installed in the terminal body and a voice input received through the microphone is received.

In an embodiment of the present disclosure, the method may further include: outputting a preset input screen able to display the formed information on at least a portion of the touch screen on the basis of the activation of the specific mode; and when a preset period of time has lapsed after the preset input screen is output on the touch screen, terminating outputting of the preset input screen.

In an embodiment of the present disclosure, at least one of a size and transparency of the preset input screen may be changed over time within the preset period of time.

In an embodiment of the present disclosure, when the touch screen is in a deactivated state in which lighting is turned off, the specific mode is activated, while at least a portion of the touch screen is switched to an activated state.

As described above, according to the mobile terminal of an embodiment of the present disclosure, when the microphone is activated in a specific manner and a preset input is applied to the microphone, a mode for receiving a touch and voice information formed by the user by applying a specific visual effect thereto may be executed. Also, the specific visual effect may be variously applied on the basis of the preset input applied through the microphone.

Thus, the user may form a memo to which various and funny visual effects are applied by variously applying the preset input.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3B is a representative view illustrating a method for controlling a mobile terminal according to an exemplary embodiment of the present disclosure.

FIGS. 4A, 4B, 4C, and 4D are views illustrating embodiments related to output states of preset input screens.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
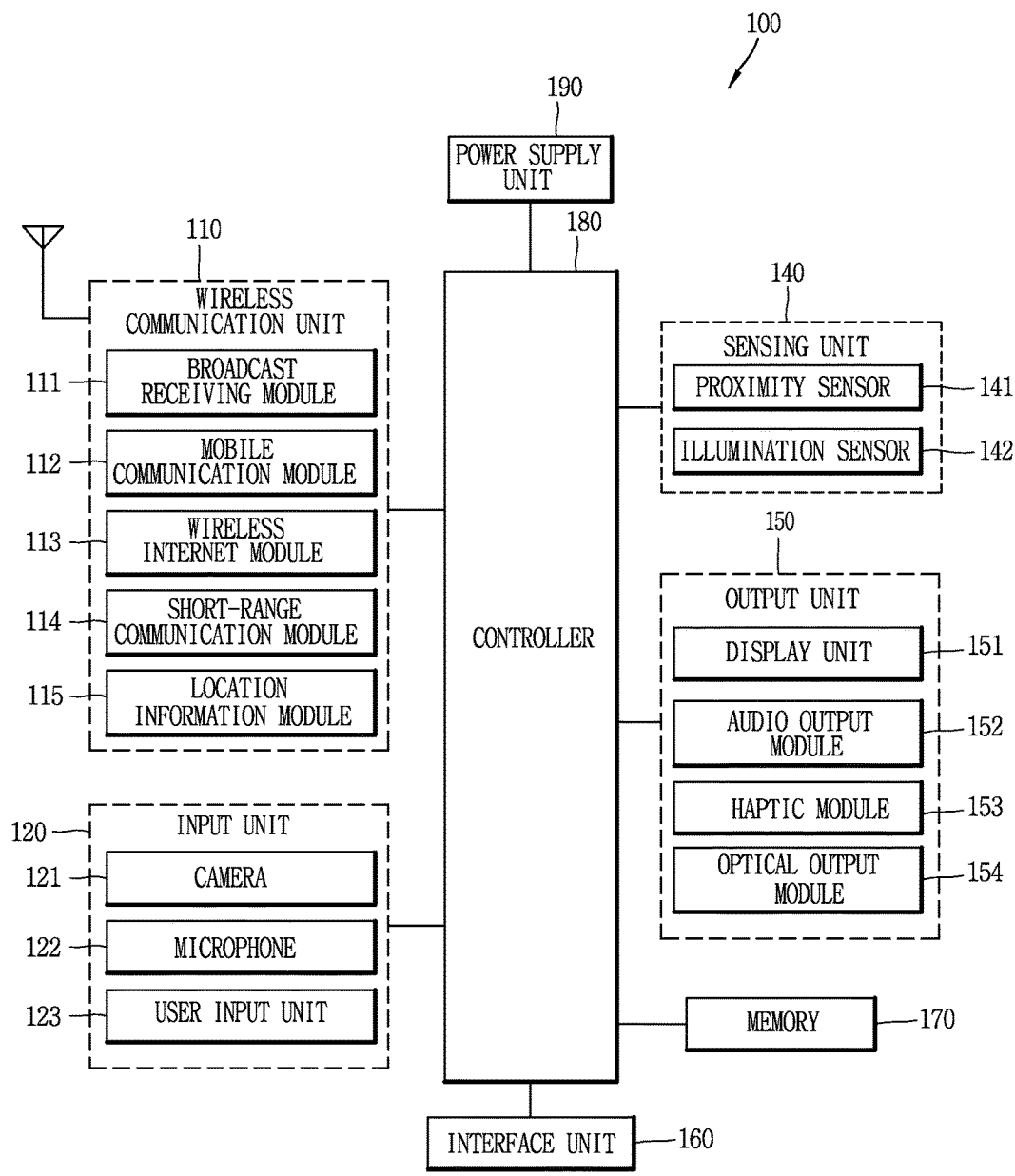
FIG. 1A is a block diagram of a mobile terminal in accordance with the present disclosure.
Figure 1B:
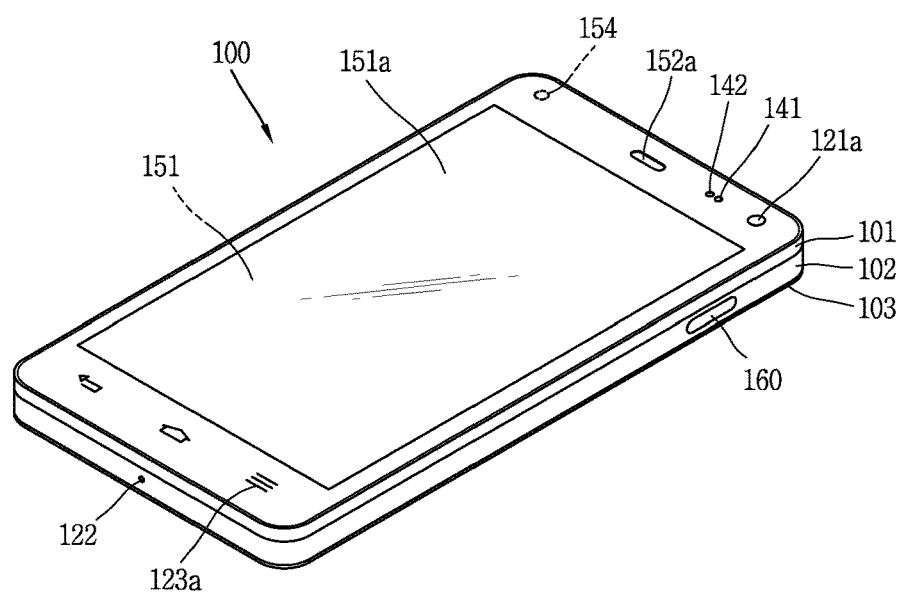
FIGS. 1B and 1C are conceptual views of one example of the mobile terminal, viewed from different directions.
Figure 1C:
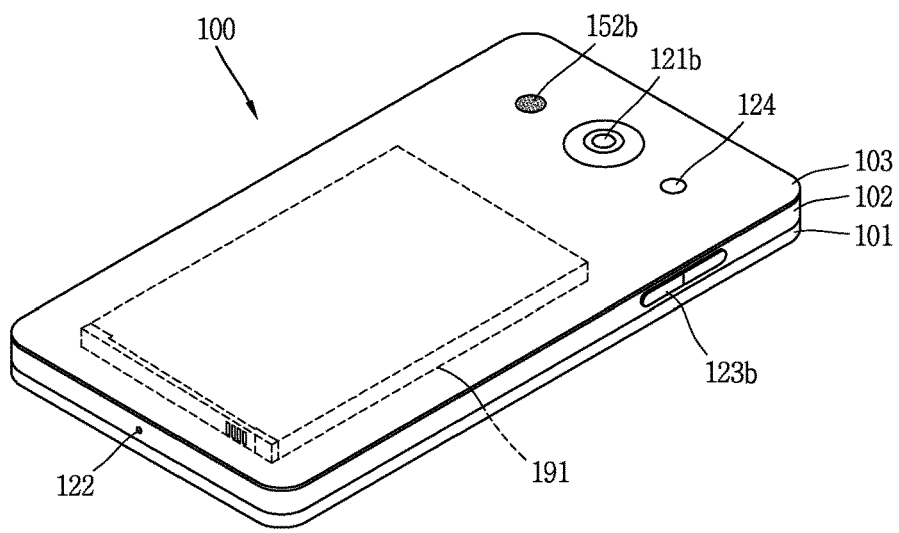

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit (or a sensor) 140, an output unit 150, an interface unit 160, a memory 170, a control unit (a controller) 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
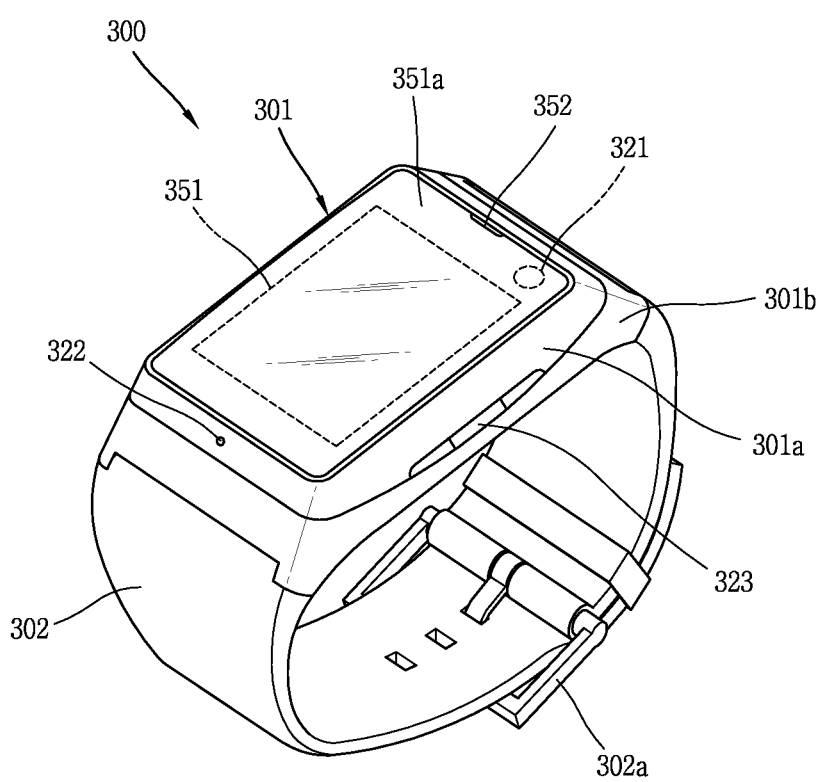
FIG. 2 is a perspective view illustrating an example of an external device 300 related to another exemplary embodiment of the present disclosure.

FIG. 2 is a perspective view illustrating one example of an external device 300 in accordance with another exemplary embodiment.

As illustrated in FIG. 2, the external device 300 includes a main body 301 with a display unit 351 and a band 302 connected to the main body 301 to be wearable on a wrist. In general, the external terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The external device 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

When a preset input is received through a microphone, a specific mode of the mobile terminal according to an exemplary embodiment of the present disclosure may be activated. Here, the specific mode is a type of memo mode in which information input by a user is received. In a state in which the specific mode is activated, the input information may be output to a touch screen according to a specific visual effect. For example, the specific visual effect may refer to an effect of maintaining an output state only for a preset period of time or an effect of changing the output state with the lapse of time.

Thus, the user may store or utilize information input by the user himself or herself by applying various visual effects thereto by using the specific mode.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 3A:
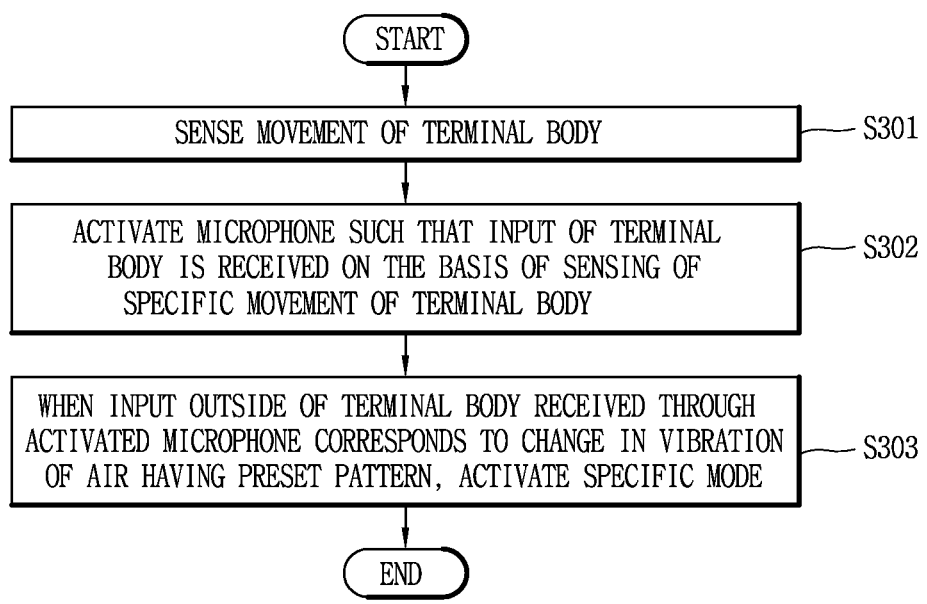
FIG. 3A is a flow chart illustrating a method for controlling a mobile terminal according to an exemplary embodiment of the present disclosure.

FIG. 3A is a flow chart illustrating a method for controlling a mobile terminal according to an exemplary embodiment of the present disclosure, and FIG. 3B is a representative view illustrating a method for controlling a mobile terminal according to an exemplary embodiment of the present disclosure.

First, referring to FIG. 3A, the mobile terminal according to an exemplary embodiment of the present disclosure may sense a movement of the main body of the mobile terminal by the sensor 140 in step S301.

The sensing unit 140 of the mobile terminal 100 according to an exemplary embodiment of the present disclosure may include various sensors for sensing at least one of information within the mobile terminal, information regarding a surrounding environment around the mobile terminal 100, and user information.

For example, the sensing unit 140 may include a proximity sensor sensing various user's gestures with respect to the main body of the mobile terminal 100, or a camera. Also, the sensing unit 140 may include a gyroscope sensor or an accelerometer sensing a movement of tilting or shaking of the main body of the mobile terminal 100 in a specific direction.

The control unit 180 may determine the movement of the main body of the mobile terminal 100 on the basis of the pieces of information sensed by the various sensors.

Also, in the mobile terminal 100 according to an exemplary embodiment of the present disclosure, the microphone 122 is installed in (or disposed on) the main body of the mobile terminal 100, and an input outside of the main body of the mobile terminal 100 may be received through the microphone 122. Here, the input from the outside of the main body of the mobile terminal 100 may refer to any type of sound event generated outside of the main body of the mobile terminal 100, for example, various types of acoustic information such as a person's voice, a sound of a specific musical instrument, a music sound, a vibration sound, and the like.

Also, the input from the outside of the main body of the mobile terminal 100 may include any type of input vibrating air outside of the main body of the mobile terminal 100, without generating a specific sound, like puffing or user's breath.

When a specific movement of the main body of the mobile terminal 100 is sensed by the sensing unit 140, the control unit 180 may activate the microphone 122 to receive an input from the outside of the main body of the mobile terminal 100 in step S302.

The specific movement of the main body of the mobile terminal 100 may include a movement of tilting the main body of the mobile terminal 100 in a specific direction or a movement of moving the main body of the mobile terminal 100 by a preset number of times. That is, as illustrated in the first drawing of FIG. 3B, the specific movement of the main body of the mobile terminal 100 may be a movement of shaking the main body of the mobile terminal 100 from side to side. In this case, at least one of the gyroscope sensor and the accelerometer included in the sensing unit 140 may be used.

In another example, the specific movement of the main body of the mobile terminal 100 may be a movement of bringing at least a portion of the main body of the mobile terminal 100 closer to the user. That is, user access to at least a portion of the main body of the mobile terminal 100 on the basis of at least one of the proximity sensor and the camera included in the sensing unit 140 may be sensed.

In a specific example, a movement of moving the main body of the mobile terminal 100 such that at least a portion of the main body of the mobile terminal 100 corresponding to a position where the microphone 122 is installed (or disposed) is close to the user's mouth may be sensed. In this case, the controller 180 may analyze information sensed by the sensing unit 140 and determine that the specific movement of the main body of the mobile terminal 100 has been sensed.

When the specific movement of the main body of the mobile terminal 100 is sensed by the sensing unit 140, the control unit 180 may activate the microphone 122 to receive an input from the outside of the main body of the mobile terminal 100.

Also, after the microphone 122 is activated, in a case in which the input from the outside of the main body of the mobile terminal 100 received through the activated microphone 122 corresponds to a change in vibration of air having a preset pattern, the control unit 180 may activate a specific mode in step S303.

Here, the change in vibration in air having a predetermined pattern may refer to at least one of a change in vibration of air having a degree of a change equal to or greater than a preset degree and a change in vibration of air maintained for a period of time equal to or greater than a preset period of time.

That is, in a case in which the change in vibration of air corresponding to the input from the outside of the main body of the mobile terminal 100 is sensed to be equal to or greater than the preset degree of a change, the control unit 180 may determine that the input from the outside of the main body of the mobile terminal 100 corresponds to a change in vibration of air having a preset pattern.

Also, when it is sensed that the change in vibration of air corresponding to the input from the outside of the main body of the mobile terminal 100 is maintained for a period of time equal to or greater than the preset period of time or is a change equal to or greater than the preset degree and maintained for the preset period of time, the control unit 180 may determine that the input from the outside of the main body of the mobile terminal 100 corresponds to the change in vibration of air having the preset pattern.

In a specific example, a change in vibration of air having the preset pattern may be sensed as air outside of the main body of the mobile terminal 100 vibrates on the basis of breath or puffing formed (or taken) by the user. That is, as illustrated in the second drawing of FIG. 3B, the input from the outside of the main body of the mobile terminal 100 formed on the basis of specific puff or breath formed by the user may be received through the microphone 122.

Alternatively, the change in vibration of air having the preset pattern may be a sound event corresponding to a simple phoneme or a syllable not having a specific meaning. In this case, the control unit 180 may determine whether the external input received through the microphone 122 is a change in vibration of air corresponding to the sound event.

Meanwhile, in order to sense such a change in vibration of air, the mobile terminal 100 according to an exemplary embodiment of the present disclosure may include at least one microphone 122. In addition, the mobile terminal 100 according to the present exemplary embodiment may sense breath or puff formed by the user by using other sensors included in the sensing unit 140.

For example, the mobile terminal 100 according to an exemplary embodiment of the present disclosure may measure at least one of a temperature and humidity of ambient air of the main body of the mobile terminal 100 by using at least one of a temperature sensor and humidity sensor included in the sensing unit 140. The control unit 180 may analyze a value measured by at least one of the temperature sensor and the humidity sensor to determine whether an external input corresponding to a change in vibration of air having a preset pattern has been received.

In this manner, in a case in which a change in vibration of air corresponding to input from the outside of the main body of the mobile terminal 100 corresponds to a change in vibration of air having a preset pattern, the control unit 180 may activate a specific mode.

The specific mode may be a memo mode in which information input from the user is formed as image information having a specific visual effect. Here, the information input from the user may be at least one of information formed on the basis of a touch input applied to the touch screen 151 provided in the mobile terminal 100 and information formed on the basis of a voice input received through the microphone 122. That is, the specific mode may be a memo mode in which information formed on the basis of at least one of the touch input and the voice input is received.

The control unit 180 may output a preset input screen on at least a portion of the touch screen 151 so that information input from the user may be displayed. Here, the preset input screen may be a screen in which the formed information is displayed to have a specific visual effect. That is, referring to the third drawing of FIG. 3B, a preset input screen 10 may be output on at least a portion of the touch screen 151.

Meanwhile, as illustrated in the second drawing of FIG. 3B, when the touch screen 151 is in a deactivated state in which lighting is turned off before the specific mode is activated, the control unit 180 may activate the specific mode, while activating at least a portion of the touch screen 151, on the basis of the reception of the change in vibration of air having the preset pattern. Here, activating at least a portion of the touch screen 151 may refer to changing the touch screen 151 to a state in which visual information is displayed in at least a portion thereof.

The control unit 180 may control the touch screen 151 such that the information formed on the basis of the touch input applied to the touch screen 151 is displayed in the preset input screen in response to the application of the touch input. In detail, the control unit 180 may control the touch screen 151 such that the formed information is displayed according to a region to which the touch has been applied, a direction in which the touch has been moved, a position of the touch, and a speed at which the touch has been applied.

That is, as illustrated in the fourth drawing of FIG. 3B, in the control unit 180 may control the touch screen 151 such that a portion corresponding to a region to which the touch has been applied is discriminately displayed according to a movement of the touch. Thus, the user may immediately check information formed on the basis of a touch applied to the touch screen 151 by the user. Thereafter, when the touch input by the user is completed, the formed information 20 may be displayed on the preset input screen 10 as illustrated in the fifth drawing of FIG. 3B.

In another example, when a voice input is received through the microphone 122, the control unit 180 may control the touch screen 151 such that the information formed on the basis of the voice input is displayed on the preset input screen in a preset style of handwriting. In this case, the control unit 180 may adjust a display speed and a display size of the information corresponding to the voice input such that the information may correspond to the speed at which the voice input is received and a magnitude of the voice input.

Also, an output state of the preset input screen may be determined to correspond to a change in vibration of air of the preset pattern. For example, an output size of the preset input screen may be varied according to whether it is output on the basis of a change in vibration of air having a preset first change degree or whether it is output on the basis of a change in vibration of air having a preset second change degree. An output state such as an output size or a position of the preset input screen will be described with reference to FIGS. 4A, 4B, 4C, and 4D hereinafter.

Also, the specific mode may be a memo mode maintained in an activated state for a preset period of time. That is, the specific mode may be a mode in which a memo is formed only regarding information input within a preset time after the specific mode is activated.

That is, when the specific mode is activated, the control unit 180 may output the preset input screen to at least a portion of the touch screen 151, and when the preset period of time has lapsed, the control unit 180 may control the touch screen 151 to terminate outputting of the preset input screen.

Also, the control unit 180 may control the touch screen 151 such that a specific visual effect that an output state of the preset input screen is changed with the passage of time appears within the preset period of time.

For example, the control unit 180 may control the touch screen 151 to change at least one of a size and transparency of the preset input screen with the passage of time within the preset period of time. Also, when a specific input is received through the microphone before the preset period of time expires, the control unit 180 may limit termination of output of the preset input screen. This will be described with reference to FIGS. 5A, 5B, and 5C hereinafter.

Meanwhile, in a case in which output of the preset input screen is terminated on the basis of the lapse of the preset period of time, the control unit 180 may store image information corresponding to the preset input screen.

Here, the image information may include information regarding a specific visual effect that information input by the user is displayed on the preset input screen within a preset period of time. Also, the image information may include information regarding specific visual effect that an output state of the preset input screen is changed within the preset period of time.

In a case in which there is a user's output request regarding the image information after the image information is stored, the control unit 180 may control the touch screen 151 to output the image information on the basis of the information regarding the specific visual effect included in the image information.

In this manner, in the mobile terminal 100 according to an embodiment of the present disclosure, when the microphone 122 is activated in a specific manner, a specific mode may be activated on the basis of a specific input received by the microphone 122. That is, in addition to the execution of the voice recognition function as a function corresponding to a voice input by the user, the microphone 122 may be activated to receive an input for executing a preset specific mode.

Thus, the user may immediately execute the specific mode by activating the microphone 122 in a specific manner, without having to input a separate voice or input a control command for executing the specific mode.

Also, the preset input screen output on the basis of the activation of the specific mode may be output when an input (a change in vibration of air having a preset pattern) corresponding to breath or puffing applied from the user. Also, the preset input screen may be, for example, a screen having a visual effect such that a glass window is fogged when the user blow his or her breath thereon. Thus, when the user applies a touch to the preset input screen, he or she may be provided with a visual effect which is distinctive and funny like the user scribbles on the fogged glass window.

As described above, the preset input screen is output on the basis of activation of the specific mode, and an output state thereof may be determined on the basis of an external input corresponding to a change in vibration of air having a preset pattern. The control unit 180 may receive an external input through the microphone 122, and may analyze the external input using pieces of information sensed by a plurality of sensors.

For example, the control unit 180 may analyze characteristics such as strength of the external input or an application time duration on the basis of at least one of a degree by which vibration of air corresponding to the external input received through the microphone 122 is changed or a time duration in which the change in vibration of air is maintained.

Also, the control unit 180 may more accurately analyze the external input by using a measurement value of at least one of the temperature sensor and the humidity sensor with respect to the external input. That is, in a case in which user's breath is applied as the external input, the control unit 180 may more minutely analyze strength of the breach by using a measurement value of a temperature and humidity of the breath.

In this manner, when the external input is analyzed, the control unit 180 may determine an output state of the preset input screen on the basis of the analyzed characteristics of the external input. Here, the output state may refer to a state related to at least one of a size, a position, and transparency of the preset input screen output on the touch screen 151.

FIGS. 4A, 4B, 4C, and 4D are views illustrating embodiments related to output states of preset input screens.

First, referring to FIG. 4A, as illustrated in the first drawing of FIG. 4A, when a specific movement of the main body of the mobile terminal 100 is sensed, the control unit 180 may activate the microphone 122. Also, in a case in which an external input outside of the terminal body corresponding to a change in vibration of air having a preset pattern is received through the activated microphone 122, the control unit 18 may analyze the change in variation of air corresponding to the external input of the terminal body and determine the external input of the terminal body.

For example, the control unit 180 may determine strength of the external input of the terminal body by analyzing a degree of the change in vibration of air corresponding to the external input of the terminal body. That is, it may be determined that strength of the external input of the terminal body is stronger as the degree of change in vibration of air corresponding to the external input of the terminal body is greater.

When it is determined that the external input of the terminal body received through the microphone 122 has a preset first strength as in the first case of FIG. 4, the control unit 180 may input a preset input screen 11a having a size corresponding to the first strength to the touch screen 151.

Alternatively, when it is determined that the external input of the terminal body received through the microphone 122 has a preset second strength greater than the first strength as in the second case of FIG. 4A, the control unit 180 may output an input screen 11b greater in size than that of the preset input screen 11a to the touch screen 151.

Although not shown, on the basis of a time at which an external input of the terminal body is received, the control unit 180 may control the touch screen 151 such that the input screen has a different size.

Thus, by adjusting the strength of the external input of the terminal body applied through the microphone 122, the user may freely form an input screen having a desired size.

Also, in a state in which the preset input screen is output, when an additional input is applied, the control unit 180 may adjust a size of the preset input screen.

Figure 4B:
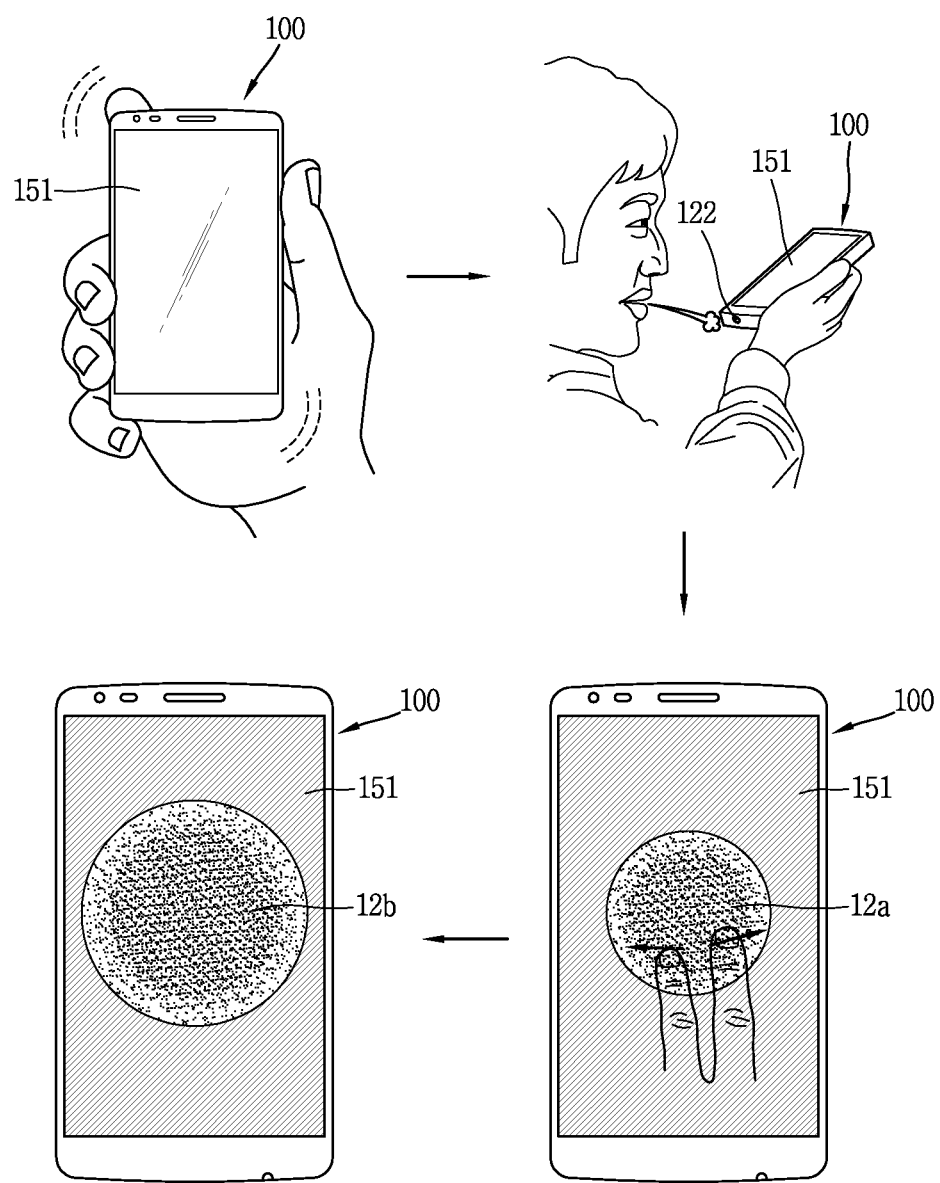

That is, in a state in which the microphone 122 is activated as illustrated in the first drawing of FIG. 4B, when an external input of the terminal body corresponding to a change in vibration of air having a preset pattern is received through the microphone 122 as illustrated in the second drawing of FIG. 4B, the preset input screen 12a may be output on at least a portion of the touch screen 151 as illustrated in the third drawing of FIG. 4B.

Also, in a deactivated state in which lighting of the touch screen 151 is turned off as illustrated in the first drawing of FIG. 4B, when external input of the terminal body is received through the microphone 122, the control unit 180 may activate the specific mode, while activating at least a portion of the touch screen 151. That is, when the at least a portion of the touch screen 151 is activated, the at least portion of the touch screen 151 may be switched to a state in which visual information can be displayed.

Thus, as illustrated in the third drawing of FIG. 4B, when a specific touch is applied to the preset input screen 12a output on at least a portion of the touch screen 151, the control unit 180 may control the touch screen 151 such that a size of the preset input screen 12a is changed.

For example, when a first touch (for example, a pinch out touch) is applied as the specific touch, the control unit 180 may control the touch screen 151 such that the preset input screen 12a is changed to an input screen 12b having a larger size as illustrated in the fourth drawing of FIG. 4B. In this case, the control unit 180 may control the touch screen 151 such that a region corresponding to the portion having the increased size is additionally switched to an activated state.

In another example, when a second touch (for example, a pinch in touch) is applied as the specific touch, the control unit 180 may control the touch screen 151 such that a size of the preset input screen is reduced.

Thus, even after the preset input screen is output, the user may easily adjust a size of the preset input screen by using an additional input.

Also, the user may adjust a position at which the preset input screen is output, by applying an input different from the input outside of the terminal body together.

That is, referring to FIG. 4C, in a case in which an external input corresponding to a change in vibration of air having a preset pattern is received through the microphone 122 in a state in which a touch applied to one point of the touch screen 151 is maintained, the control unit 180 may output the preset input screen to the position corresponding to the one point.

In detail, as illustrated in the first case of FIG. 4C, when an input outside of the terminal body is received through the microphone 122 in a state in which a touch applied to one point of a right upper end portion of the touch screen 151 is maintained, the control unit 180 may output a preset screen 13a to a position corresponding to the one point.

Also, as illustrated in the second case of FIG. 4C, when an input outside of the terminal body is received through the microphone 122 in a state in which a touch is maintained in a different point of a left upper end portion of the touch screen 151, the control unit 180 may output a preset input screen 13b to a position corresponding to the different point.

The control unit 180 may control the touch screen 151 such that a middle point of the preset input screen is placed at a position corresponding to the point to which the touch is applied. Thus, even though a shape of the preset input screen is set in advance, a shape of the preset input screen output on the touch screen 151 may be varied according to positions to which the touch is applied.

Also, in a state in which the preset input screen is output, when a touch input is additionally applied, the control unit 180 may change the position to which the preset input screen is output. That is, as illustrated in the third drawing of FIG. 4D, the preset input screen 14 may be output at a preset position on the touch screen 151.

Figure 4D:
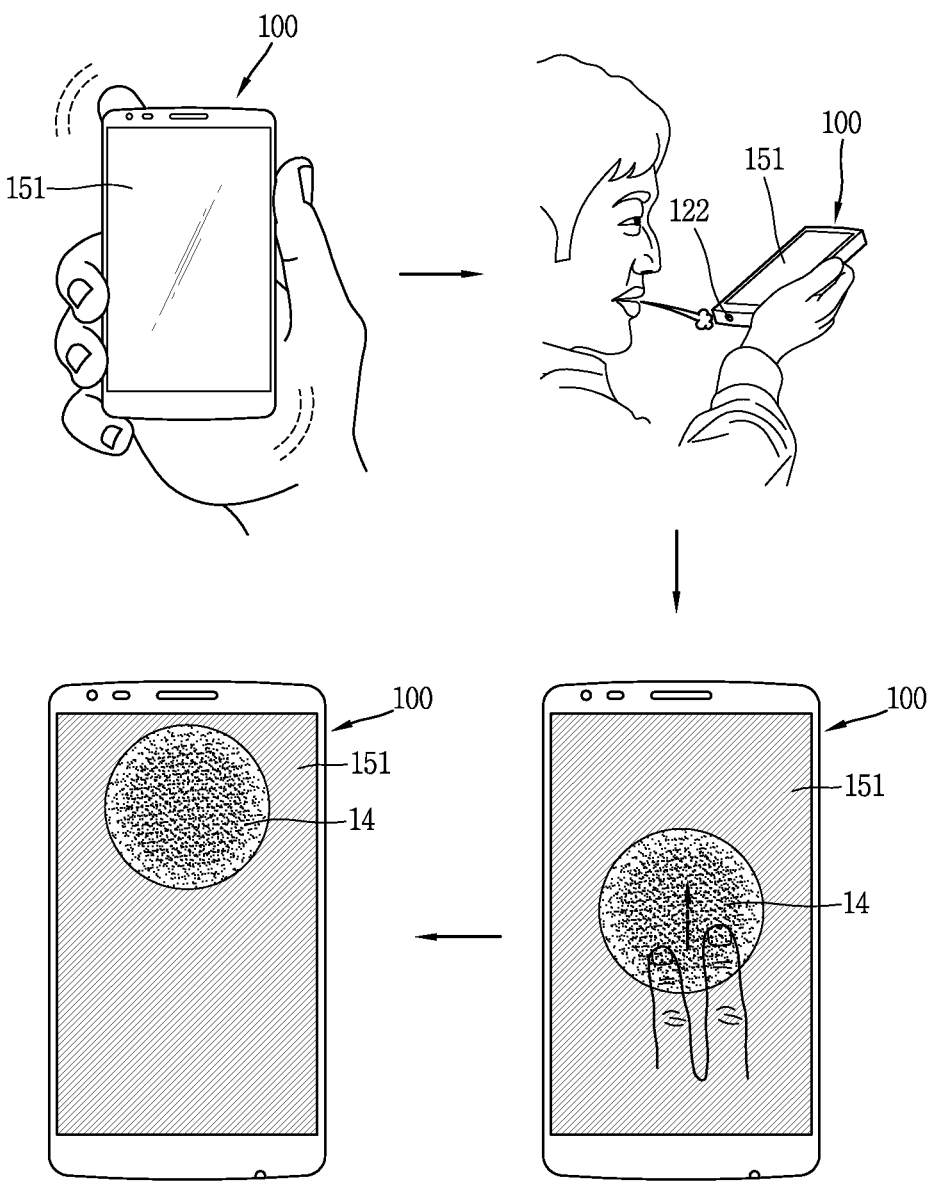

Here, as illustrated in the third drawing of FIG. 4D, when a specific touch is applied to the preset input screen 14 in a specific direction (for example, touches simultaneously applied to at least two points spaced apart from one another are dragged in a specific direction), the control unit 180 may move the preset input screen 14 to correspond to the specific direction.

Thus as illustrated in the fourth drawing of FIG. 4D, the preset input screen 14 may be moved to an upper end of the touch screen to correspond to the direction (direction toward the upper end of the touch screen) of the specific touch, so as to be output.

In this manner, the user may variously form an output state of the preset input screen by adjusting strength or duration time of an input outside of the terminal body. Also, the user may change an output state of the preset input screen, which is already output, by using various inputs, and thus, user convenience may be enhanced.

Meanwhile, the preset input screen may be output on the assumption that the specific mode is maintained in an activated state. That is, output of the preset input screen may be maintained only for a preset period of time, and when the preset period of time has lapsed, the output of the preset input screen may be terminated.

Figure 5A:
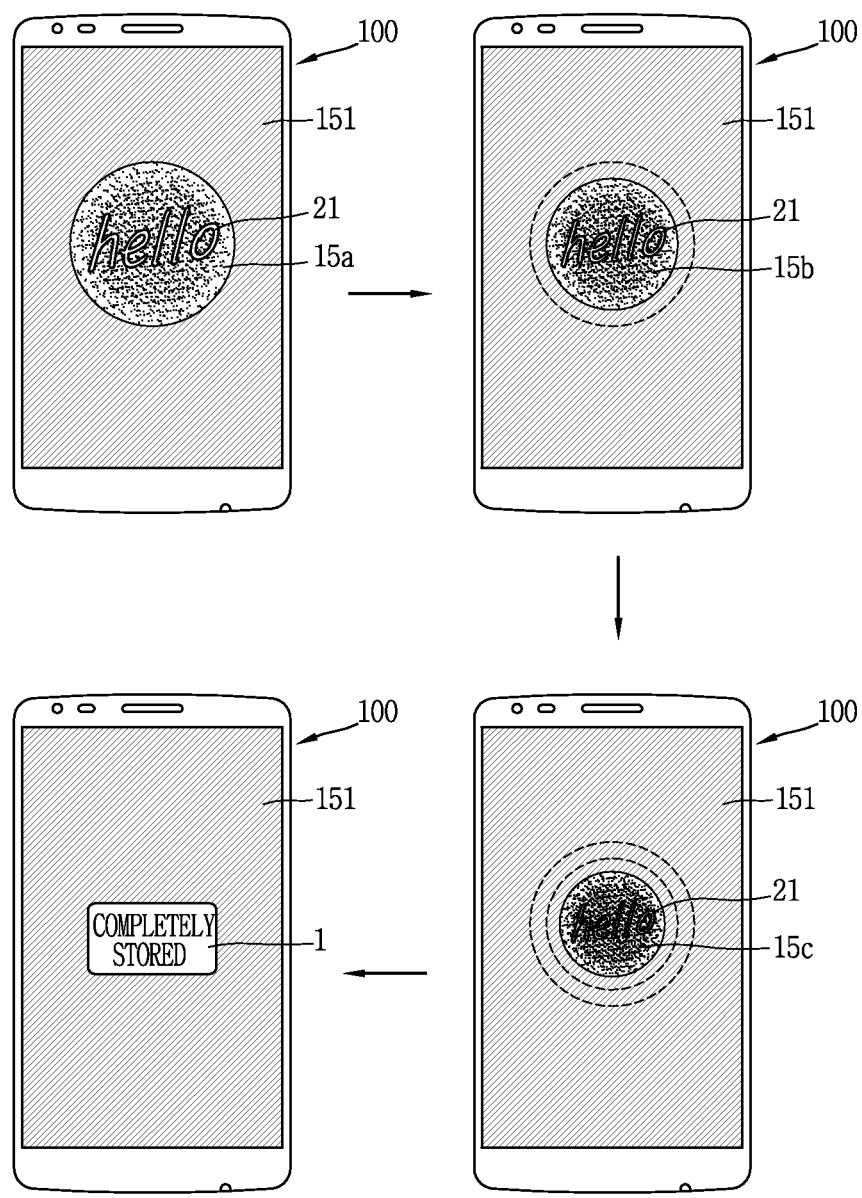
FIGS. 5A, 5B, and 5C are views illustrating embodiments regarding activation of preset input screens.
Figure 5B:
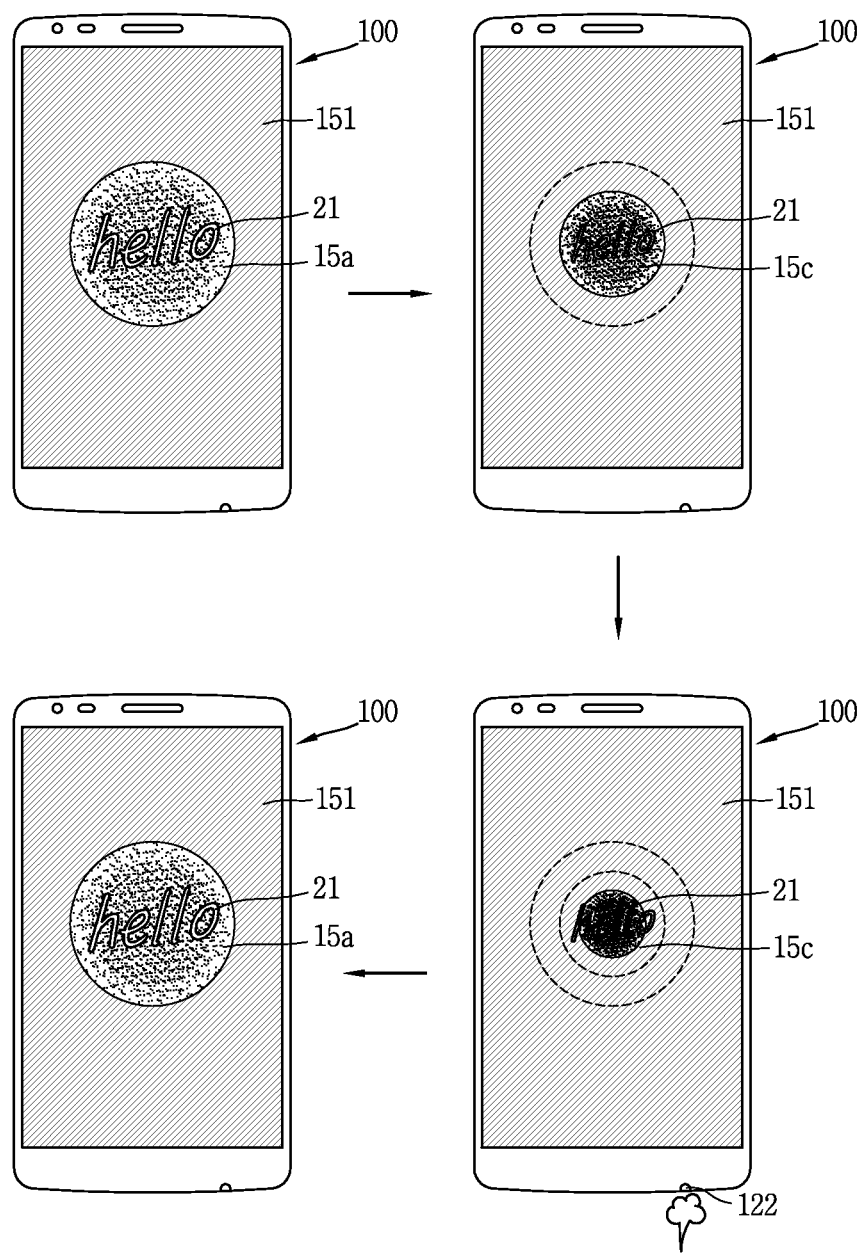
Figure 5C:
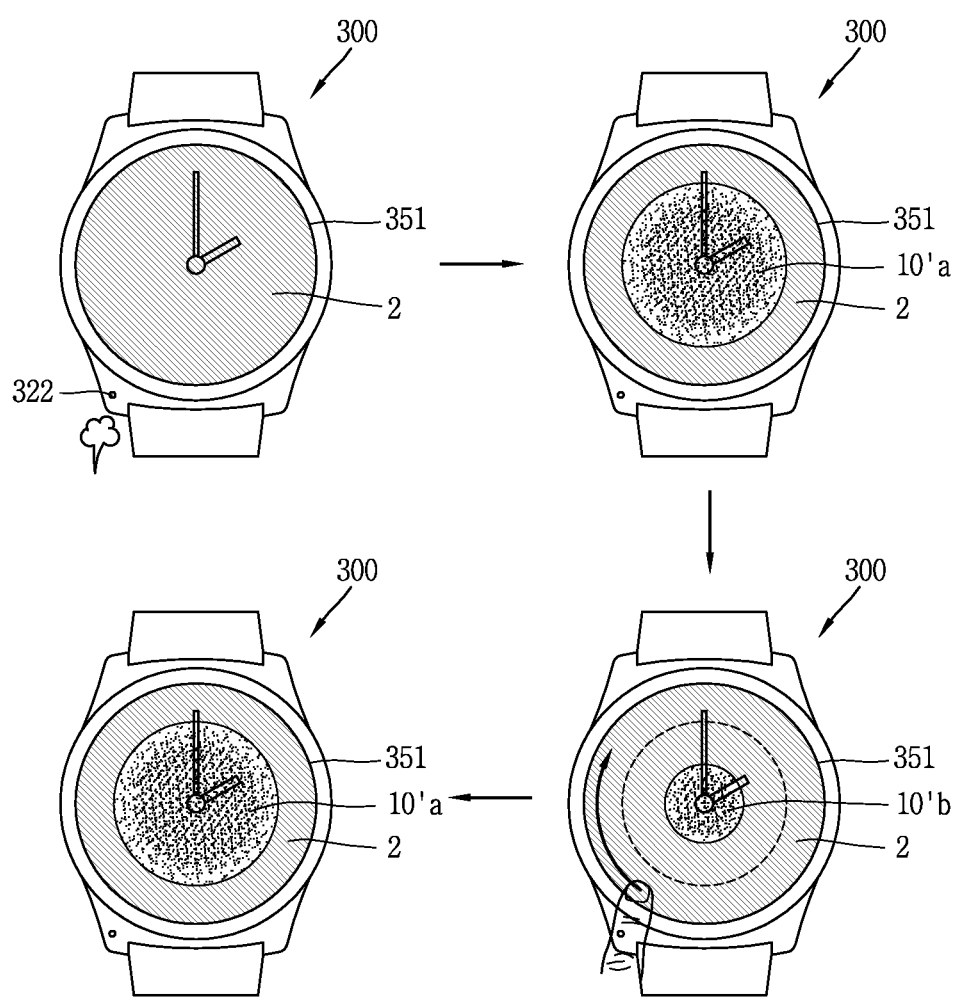

FIGS. 5A, 5B, and 5C are views illustrating embodiments regarding activation of preset input screens.

First, referring to FIG. 5A, a preset input screen 15a may be output on at least a portion of the touch screen 151, and information 21 input by the user may be displayed in the preset input screen 15a.

The control unit 180 may change an output state of the preset input screen over time. In detail, the control unit 180 may control the touch screen 151 such that at least one of a size and transparency of the preset input screen is changed over time within the preset period of time.

That is, as illustrated in the second drawing of FIG. 5A, the control unit 180 may control the touch screen 151 such that the preset input screen 15a is changed to an input screen 15b having a smaller size with the lapse of a specific time within the preset period of time.

In this state, when the specific period of time has further lapsed, the control unit 180 may control the touch screen 151 such that an input screen 15c having a size smaller than that of the input screen 15b is output as illustrated in the third drawing of FIG. 5A.

As the size of the preset input screen is changed in this manner, a size of information 21 input by the user may also be changed to correspond thereto so as to be displayed. Alternatively, as the size of the preset input screen is changed, outputting of at least a portion of the input information may be terminated.

Also, when the preset period of time has lapsed, the control unit 180 may control the touch screen 151 such that outputting of the preset input screen is terminated. In a case in which outputting of the preset input screen is terminated as the preset period of time has lapsed, image information corresponding to the preset input screen including the input information may be stored. Also, the control unit 180 may output information 1 regarding storing of the image information on one region of the touch screen 151 as illustrated in the fourth drawing of FIG. 5A.

Meanwhile, although not shown, in a case in which a preset condition is met (for example, in a case in which a specific input is applied from the user) before outputting of the preset input screen is terminated, the control unit 180 may immediately terminate outputting of the preset input screen and store the image information corresponding to the preset input screen.

That is, when a specific movement of the terminal body is sensed or when a specific input is received through the microphone 122, the control unit 180 may determine whether the preset condition is met.

Meanwhile, in a case in which a specific input is received through the microphone 122 before the preset period of time has lapsed, the control unit 180 may maintain outputting of the preset input screen.

That is, referring to the first and second drawings of FIG. 5B, the size of the preset input screen may be gradually decreased over time within the preset period of time. Also, as illustrated in the third drawing of FIG. 5B, in a state in which a preset input screen 15c having a reduced size is output on the touch screen 151, a specific input may be received through the microphone 122.

Here, the specific input may be the same as an input outside of the terminal body corresponding to a change in vibration of air having a preset pattern. In this case, the control unit 180 may calculate again the preset period of time, starting from a point at which the specific input is received. That is, the control unit 180 may control the touch screen 151 such that outputting of the preset input screen is maintained for the preset period of time, starting from a point in time at which the specific input is received.

As illustrated in the fourth drawing of FIG. 5B, the control unit 180 may control the touch screen 151 such that the reduced input screen 15c is changed to the preset input screen 15a having the initial output size and transparency. Thus, the user may visually check that a time for activating the preset input screen has been extended through the preset input screen output to have the extended size.

Although not shown, the information displayed on the preset input screen may be corrected or deleted on the basis of a specific input. For example, when a touch gesture (a touch gesture of dragging horizontally) of deleting the information displayed on the preset input screen is applied, the control unit 180 may control the touch screen 151 such that at least a portion of the information corresponding to the region to which the touch has been applied is deleted.

Thus, the user may extend the activated state of the preset input screen by applying a specific input, and may input additional new information to the preset input screen or may correct the displayed information.

Meanwhile, the control method according to an embodiment of the present disclosure may also be applied to the wearable device 300 illustrated in FIG. 2. For example, when the control method according to an embodiment of the present disclosure is applied to the wearable watch 300, the preset input screen may be output on at least a portion of the touch screen 351 included in the wearable watch 300.

That is, as illustrated in FIG. 5C, when a specific movement of the main body of the wearable watch 300 is sensed, the microphone 322 is activated and an external input corresponding to a change in vibration of air having a preset pattern may be received through the microphone 322. Also, a standby screen 2 of the touch screen 351 of the wearable watch 300 may be output.

Here, as illustrated in the first drawing of FIG. 5C, when an external input corresponding to a change in vibration of air having a preset pattern is received through the microphone 322, the specific mode is activated, and as illustrated in the second drawing of FIG. 5C, a preset input screen 10'a may be output on at least a portion of the touch screen 151.

Also, the control unit of the wearable watch 300 may control the touch screen 351 such that outputting of the preset input screen 10' is maintained only for a preset period of time in which the activated state of the specific mode is maintained. The control unit of the wearable watch 300 may control the touch screen 351 such that at least one of transparency and a size of the preset input screen 10'a over time within the preset period of time.

Thus, as illustrated in the third drawing of FIG. 5C, the preset input screen 10'a may be changed to an input screen 10b' having a reduced size. Here, as illustrated in the third drawing of FIG. 5C, a specific touch may be applied to the touch screen 351 in a preset direction (a rotational touch gesture applied along the circumference of the touch screen). In this case, the control unit of the wearable watch 300 may start again the preset period of time from a point in time at which the specific touch is applied.

That is, as illustrated in the fourth drawing of FIG. 5C, the control unit of the wearable watch 300 may control the touch screen 351 such that the reduced input screen 10'b is changed to the preset input screen 10'a at a point in time at which the specific touch is applied.

In this manner, when the control method of the present disclosure is applied to the wearable watch 300, a specific touch for maintaining outputting of the preset input screen may be utilized in consideration of a form of the touch screen 351.

Hereinafter, another embodiment in which information input from the user is displayed on the preset input screen will be described with reference to FIGS. 6A and 6B.

Figure 6A:
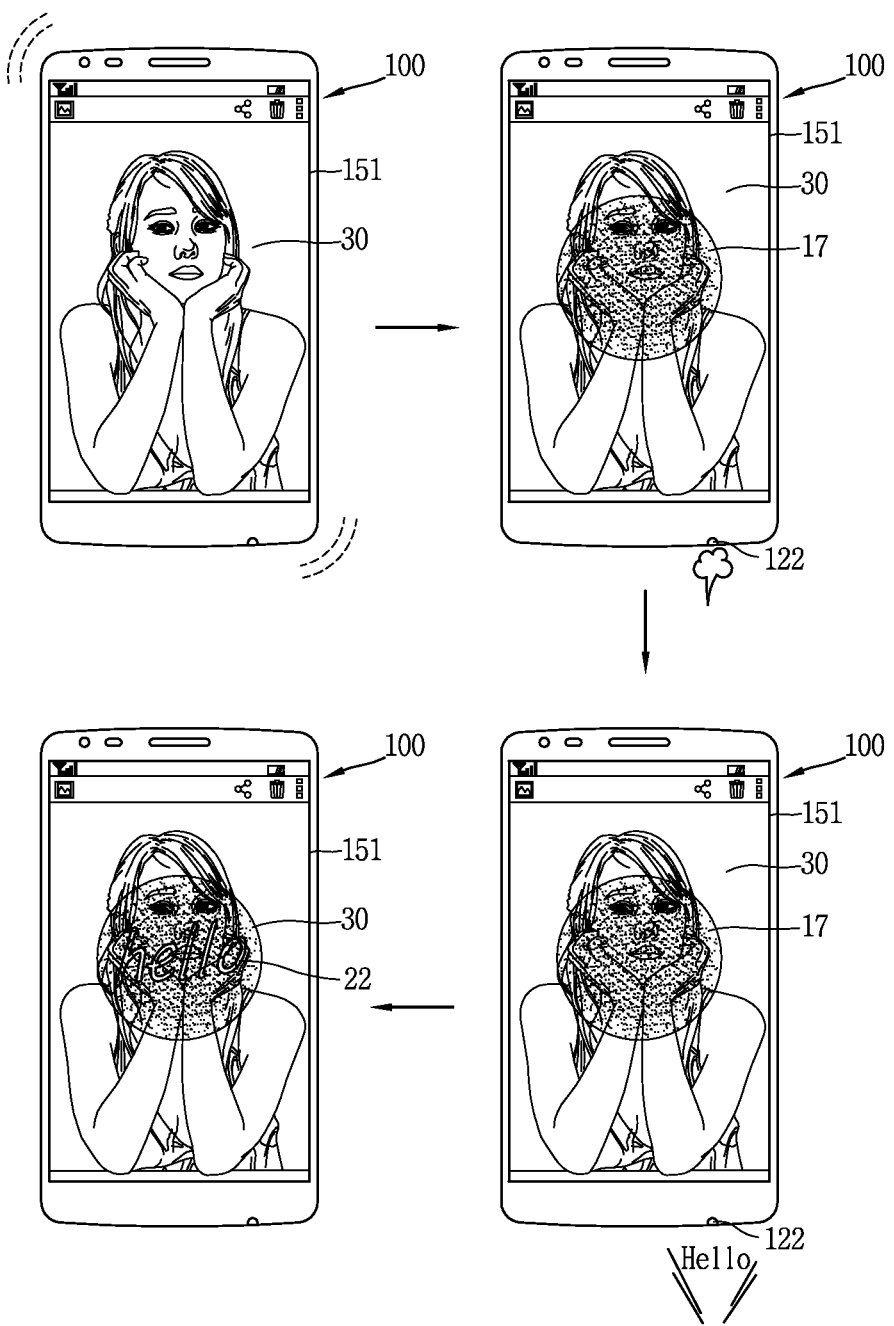
FIGS. 6A and 6B are views illustrating embodiments in which information input by a user is displayed on a preset input screen.
Figure 6B:
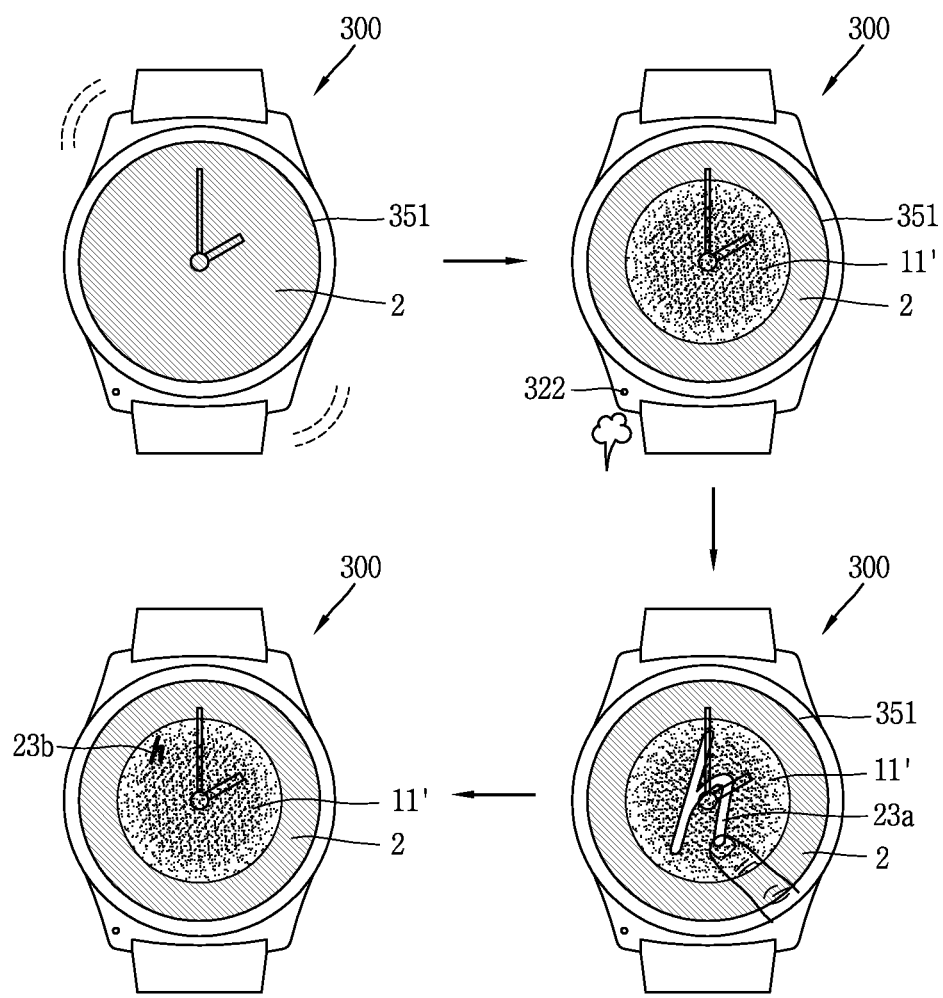

FIGS. 6A and 6B are views illustrating embodiments in which information input by a user is displayed on a preset input screen.

First, referring to FIG. 6A, screen information 30 may be output on the touch screen 151. Here, the screen information 30 may be any type of screen that may be output on the touch screen 151. For example, the screen information may include a home screen page, a lock screen, or an execution screen of a specific application.

In this manner, in a state in which the screen information 30 is output on the touch screen 151, when a specific movement of the terminal body is sensed, the microphone 122 is activated, and an external input corresponding to a change in vibration of air having a preset pattern may be received through the microphone 122.

In this case, on the basis of the received external input, the control unit 180 may output a preset input screen 17 in at least one region of the screen information 30 in an overlapping manner. Also, the preset input screen 17 may be output with preset transparency such that the preset input screen 17 does not cover at least one region of the screen information 30.

In this manner, in a state in which the preset input screen 17 is output, as illustrated in the third drawing of FIG. 6A, a voice input may be received through the microphone 122. The control unit 180 may analyze the voice input and display information formed on the basis of the voice input on the preset input screen 17. In this case, as illustrated in the fourth drawing of FIG. 6A, the control unit 180 may control the touch screen 151 such that the information formed on the basis of the voice input is displayed in a preset letter form.

Here, the control unit 180 may control the touch screen 151 to display the formed information such that transparency of a portion corresponding to a region in which the formed information is displayed is changed on the preset input screen 17. For example, the control unit 180 may adjust transparency of the portion corresponding to the region in which the formed information is displayed is 100 in the preset input screen.

Thus, the user may be provided with a visual effect that he or she may check at least a portion of the screen information through the portion corresponding to the region in which the formed information is displayed in the preset input screen.

In a state in which the preset input screen 11' is output on the touch screen 351 of the wearable watch 300 as illustrated in FIG. 6B, when a touch input is applied to the touch screen 351 as illustrated in the third drawing of FIG. 6B, the formed information may be displayed to correspond to the touch input on the basis of the touch input.

Here, the control unit of the wearable watch 300 may control the touch screen 351 such that the formed information having a size smaller than that displayed to correspond to the touch input is input to the preset input screen 11'. For example, as illustrated in the fourth drawing of FIG. 6B, the control unit of the wearable watch 300 may control the touch screen 151 such that the formed information having a preset size is input on the preset input screen 11'.

That is, in a case in which information is input on the touch screen having a small size, such as the wearable watch 300, by using a touch input, the user may input information by utilizing the entire region of the touch screen. Also, the control unit of the wearable watch 300 may display previously input information in a reduced size on the preset input screen to provide user convenience such that the user may continuously input information.

As described above, when the specific mode is activated in a state in which screen information is output on the touch screen 151 of the mobile terminal 100, a preset input screen having preset transparency may be output on at least one region of the screen information in an overlapping manner. That is, the user may be provided with convenience such that he or she may utilize the specific mode without being interfered in using the screen information.

Figure 7A:
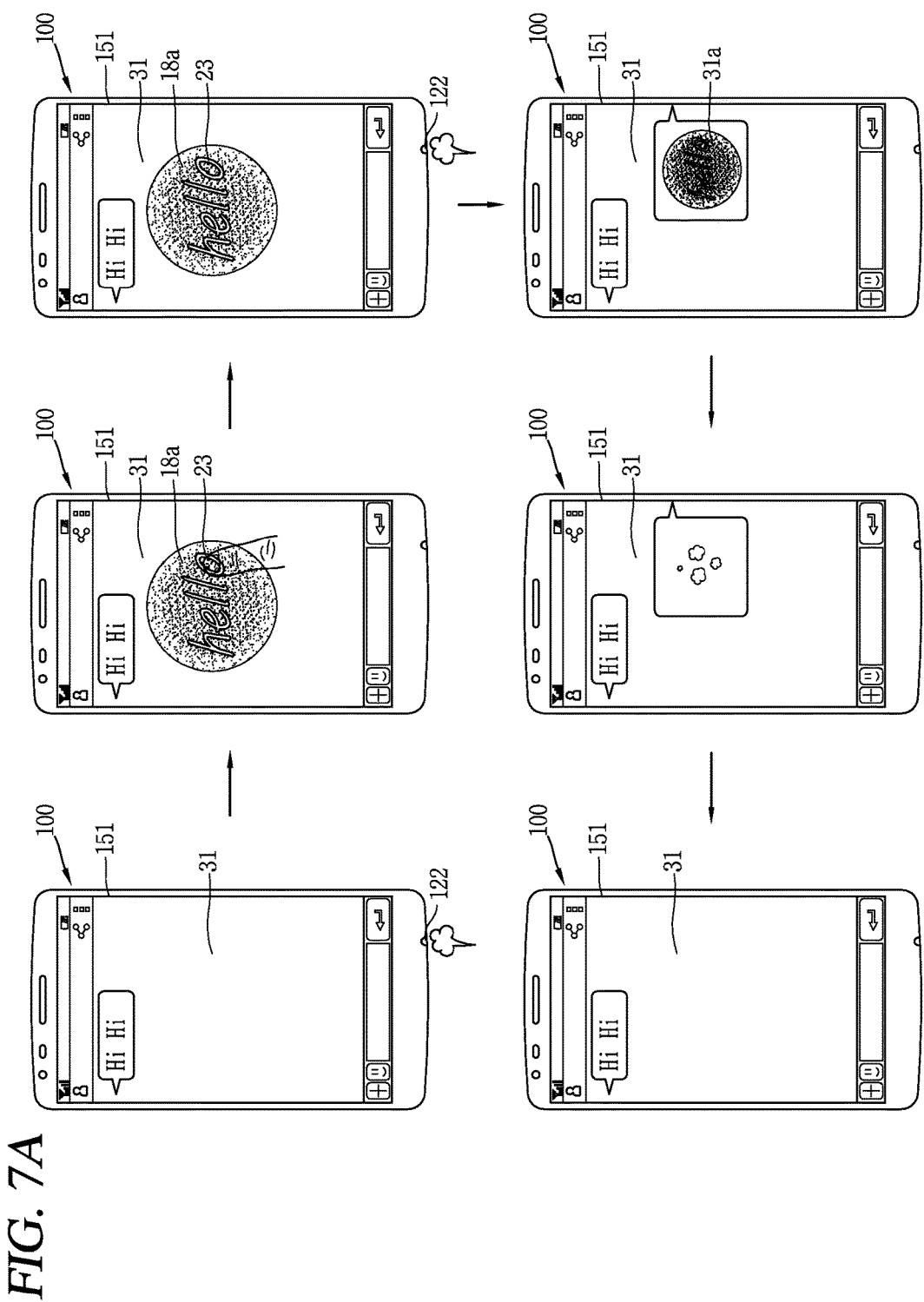
FIGS. 7A, 7B, and 7C are views illustrating embodiments regarding activation of a specific mode in a state in which screen information is output.
Figure 7B:
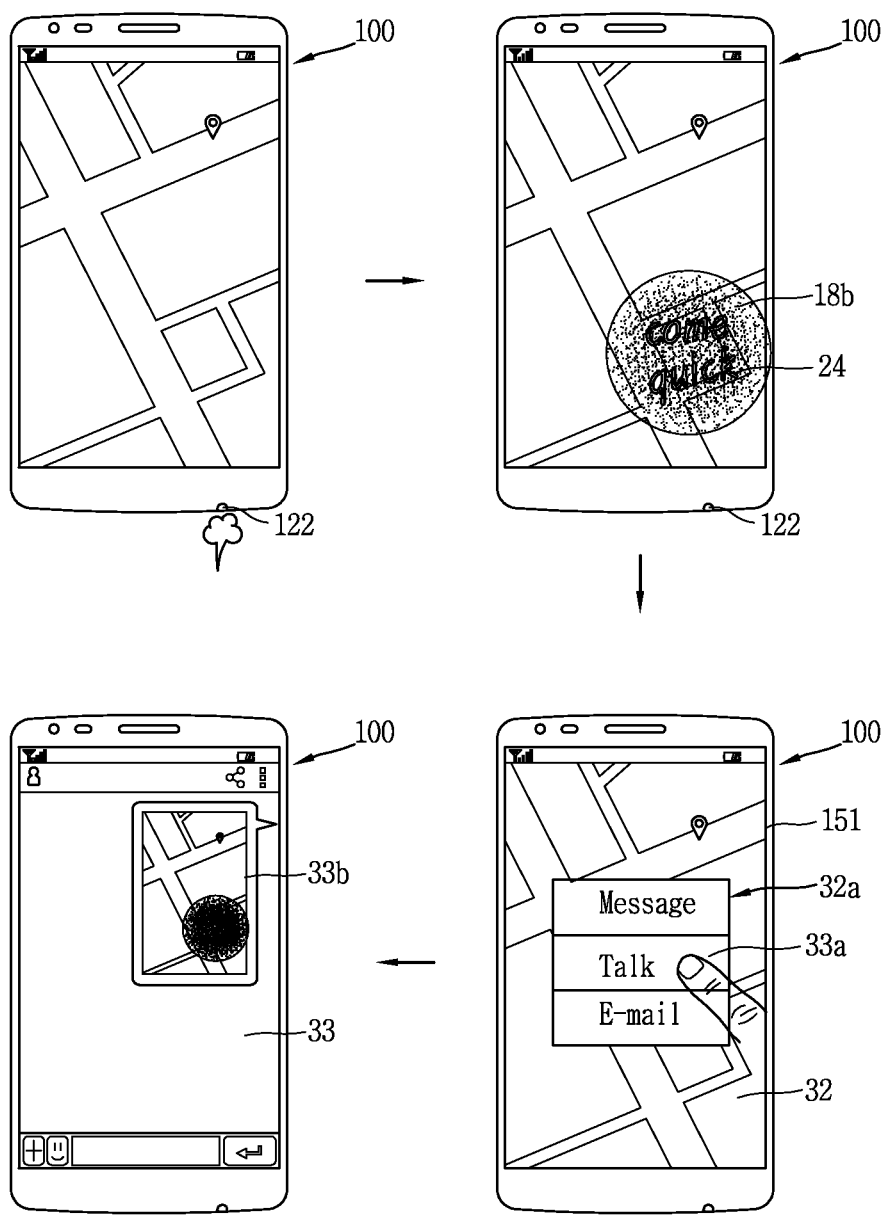
Figure 7C:
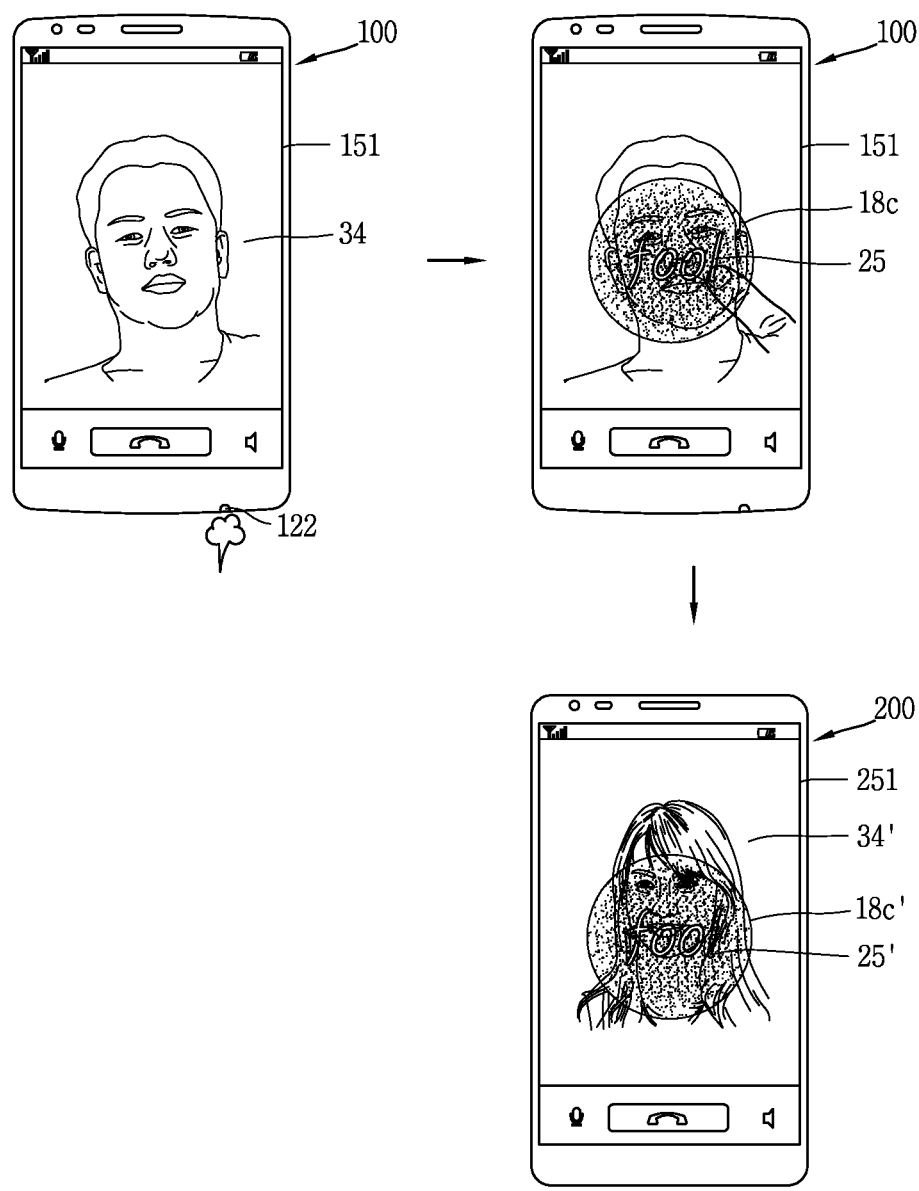

FIGS. 7A, 7B, and 7C are views illustrating embodiments regarding activation of a specific mode in a state in which screen information is output.

First, referring to FIG. 7A, an execution screen 31 of a messenger application may be output on the touch screen 151 of the mobile terminal 100. In this state, in a case in which an input for activating the specific mode is input through the microphone 122, a preset input screen 18a may be output on an execution screen 23 of the application in an overlapping manner.

Also, after the information 23 formed on the basis of a user's touch input is displayed on the input screen 18a, as illustrated in the third drawing of FIG. 7A, a specific input may be received by the microphone 122. Here, the specific input may correspond to an input outside of the terminal body for activating the specific mode. However, the present disclosure is not limited thereto and the specific input may correspond to a sound event not including a meaning such as a specific phoneme or syllable or a voice event including a specific keyword.

In this manner, when the specific input is received through the microphone 122, the control unit 180 may process image information corresponding to the preset input screen 18a by associating the image information to an execution screen 31 of the messenger application.

In detail, when the specific input is received, the control unit 180 may store image information corresponding to the preset input screen 18a. Also, the control unit 180 may control the wireless communication unit 110 to transmit the stored image information to the external terminal by using information corresponding to the external terminal included in the execution screen 31 of the messenger application.

In a case in which the execution screen 31 of the messenger application corresponds to a function for transmitting information to the external terminal in real time, the control unit 180 may transmit the stored image information to the external terminal and control the touch screen 151 such that the stored image information is included in the execution screen 31 of the messenger application.

Here, outputting of the stored image information 31a included in the execution screen 31 of the messenger application may be maintained for a preset period of time. That is, when the preset period of time has expired, the control unit 180 may control the touch screen 151 to terminate outputting of the stored image information as illustrated in the fifth drawing of FIG. 7A. Thus, as illustrated in the sixth drawing of FIG. 7A, after the outputting of the stored image information is terminated, only the execution screen 31 of the messenger application may be output on the touch screen 151.

In this manner, in addition to inputting and storing information by utilizing the specific mode, information stored by the specific mode may be processed by associating it with a function being executed when the specific mode is activated. Also, since an output state of the stored information is maintained only for a preset period of time, it may provide various visual funs to the user.

Also, the control unit 180 may store the screen information being output on the touch screen 151 and the image information corresponding to the preset input screen together. That is, as illustrated in FIG. 7B, an execution screen 32 of a map application may be output on the touch screen 151.

In this state, as illustrated in the first drawing of FIG. 7B, the specific mode may be activated on the basis of an input received by the microphone 122, and as illustrated in the second drawing of FIG. 7B, a preset input screen 18b may be output to overlap with preset transparency on the execution screen 32 of the map application. Also, information 24 formed on the basis of a user input may be displayed on the preset input screen 18b.

Here, the control unit 180 may output a specific window 32a including menu information related to a function to one region of the touch screen 151 as illustrated in the third drawing of FIG. 7B. Here, the menu information related to the function may be menu information regarding a function that may be processed in relation to image information corresponding to the execution screen 32 and the preset input screen 18b.

In a case in which the user selects one menu information 33a as illustrated in the third drawing of FIG. 7B, the control unit 180 may associate the function corresponding to the one menu information 33a and the image information and process the same.

In detail, the control unit 180 may execute a function corresponding to the one menu information 33a, and as illustrated in the fourth drawing of FIG. 7B, the control unit 180 may change the execution screen 32 to the execution screen 33 of the function corresponding to the one menu information 33a and output the same. Also, after the image information corresponding to the preset input screen 18b is stored, the image information may be used for executing the one menu information 33a. That is, as illustrated in the fourth drawing of FIG. 7B, the control unit 180 may include the image information 33b in the execution screen 33 of the one menu information 33a.

In FIG. 7B, an embodiment in which, after the formed information is displayed on the preset input screen, a specific window including the menu information is output before the outputting of the preset input screen is terminated is illustrated. However, it may be set such that the preset input screen may be output when a specific condition is met (for example, in a case in which an additional input is applied from the user).

Meanwhile, on the basis of a user input received before outputting of the preset input screen is terminated, the control unit 180 may store image information corresponding to the preset input screen differently.

In detail, when a preset type of first user input is received, the control unit 180 may store only image information corresponding to the preset input screen. Alternatively, when a preset type second user input is received, the control unit 180 may store image information corresponding to the preset input screen and at least a portion of the screen information output on the touch screen 151.

Here, the user input may be received by at least one of the microphone 122, the touch screen 151, and the sensing unit 140. For example, the case may include a case in which a specific sound event is received through the microphone 122, a case in which a specific touch is applied to the preset input screen, or a case in which a specific movement of the terminal body or a specific movement with respect to the terminal body is sensed by the sensing unit 140.

Thus, in a case in which the specific mode is used while a specific function related to the screen information output on the touch screen 151 is being executed, the user may separately store only the formed image information or associate the image information with the screen information and store the same on the basis of the specific mode by applying various user inputs.

Meanwhile, in addition to the transmission of the stored image information to the external terminal in a state in which inputting of information to the preset input screen is completed, image information corresponding to the input screen may be transmitted to the external terminal in real time while information is being input to the preset input screen.

That is, referring to FIG. 7C, a video call function may be executed in the mobile terminal 100, and an execution screen 34 corresponding to the video call function may be output on the touch screen 151. Here, as illustrated in the first drawing of FIG. 7C, when the specific mode is activated on the basis of an input outside of the terminal body received through the microphone 122, as illustrated in the second drawing of FIG. 7C, a preset input screen 18c may be output on the execution screen 34 of the video call function in an overlapping manner.

Also, the control unit 180 may transmit a control command to a counterpart terminal 200 of the video call function such that an output screen 18c' corresponding to the preset input screen 18c is displayed on the counterpart terminal 200 to correspond to the output of the preset input screen 18c. That is, the control command may be a control command for outputting image information corresponding to the preset input screen 18c on a touch screen 251 of the counterpart terminal 200.

In this manner, after the control command is transmitted to the counterpart terminal 200, when the formed information 25 is displayed on the preset input screen 18c on the basis of a touch applied to the touch screen 151, the control unit 180 may transmit a control command corresponding to the display of the formed information 25 to the counterpart terminal 200.

Thus, as illustrated in the third drawing of FIG. 7C, an output screen 18'c on which the information 25' is formed on the basis of the touch may be displayed to overlap on the execution screen 34' of the video call function in the touch screen 251 of the counterpart terminal 200.

In this manner, image information corresponding to the preset input screen in a state in which the formed information is displayed on the preset input screen may be shared with the external terminal. Also, image information corresponding to the preset input screen in a state in which the information formed by the user is displayed on the preset input screen may be shared in real time with the external terminal. Thus, the user may freely share various types of image information with the external terminal by utilizing the specific mode.

In this manner, after pieces of image information corresponding to the preset input screen formed in a state in which the specific mode is activated are stored, the image information may be output again according to an output request from the user. Here, in a case in which the stored pieces of image information are output, the control unit 180 may control the touch screen 151 to output the image information on the basis of a visual effect applied to the preset input screen.

In a specific example, after handwriting information on the basis of a specific touch is displayed on the preset input screen, image information corresponding to the preset input screen may be stored and the image information may be output according to an output request from the user. In this case, the control unit 180 may output the image information on the basis of a visual effect applied in the process of inputting the handwriting information.

For example, in a case in which the handwriting information is input on the basis of a drag touch applied from the left side to the right side, a visual effect of handwriting information formed from the left side to the right side may be applied to the image information output on the basis of the output request so as to be output.

That is, the image information corresponding to the preset input screen may be an image file in which an image is moved for a preset period of time. For example, the image information corresponding to the preset input screen may be formed as a graphics interchange format (GIF). Meanwhile, image information (still image) corresponding to the preset input screen in a state in which input of handwriting information is completed may be output.

On the basis of a user request, the control unit 180 may output a separate list screen storing pieces of image information formed by the specific mode. The separate list screen may be output on the basis of execution of an application corresponding to a function of storing image information such as a gallery application, for example.

Hereinafter, embodiments related to outputting of pieces of stored image information on the basis of the specific mode will be described with reference to FIGS. 8A and 8B.

Figure 8A:
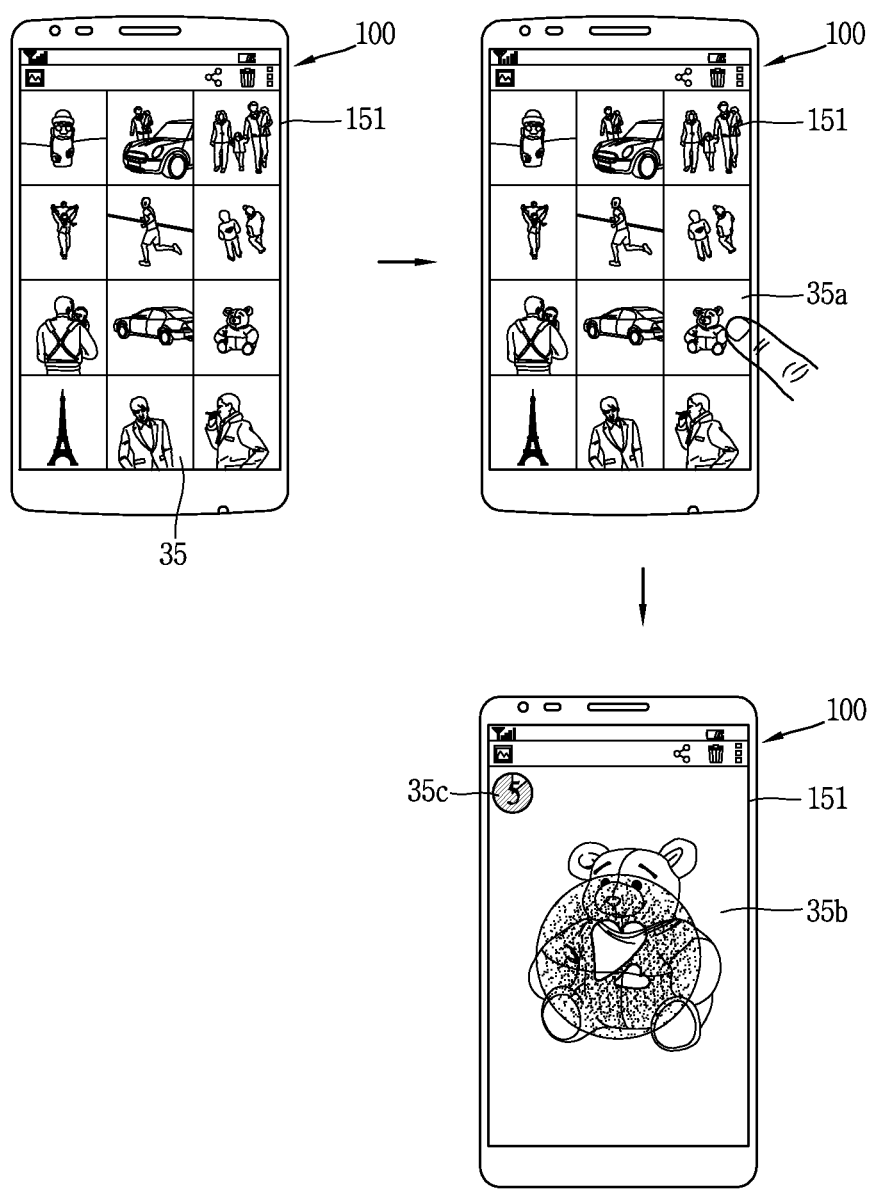
FIGS. 8A and 8B are views illustrating embodiments related to outputting stored image information by activating a specific mode.
Figure 8B:
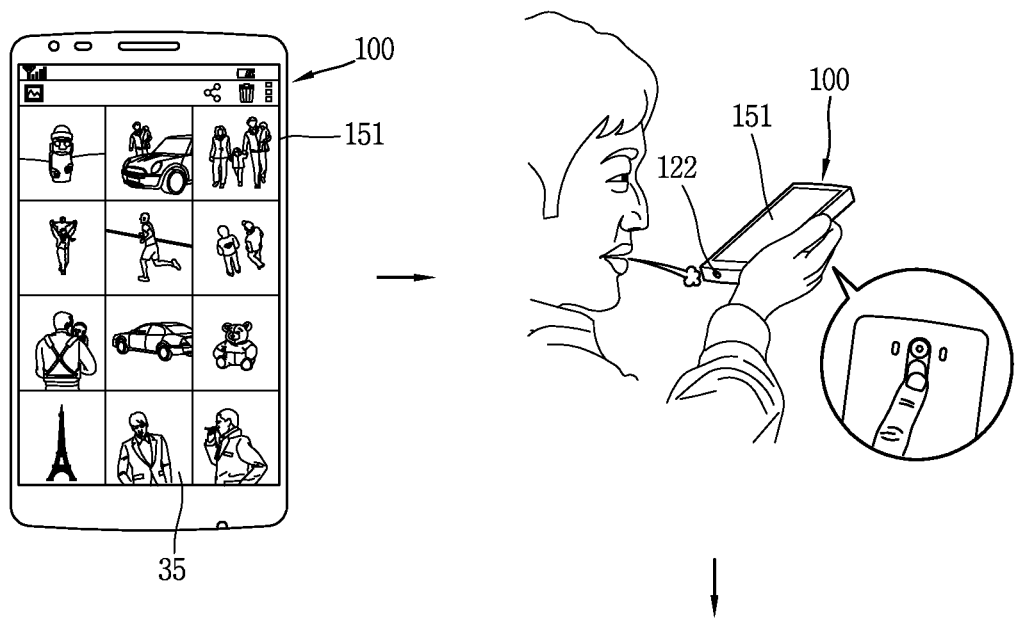
Figure 8B:
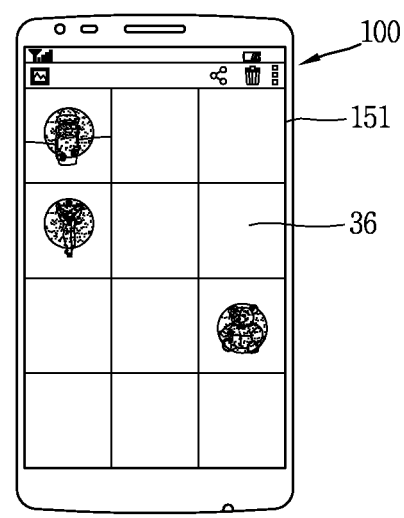

FIGS. 8A and 8B are views illustrating embodiments related to outputting stored image information by activating a specific mode.

First, referring to FIG. 8A, a list screen 35 regarding the stored image information may be output on the touch screen 151 according to a user request. Here, as illustrated in the second drawing of FIG. 8A, a touch input for selecting one list 35a included in the list screen 35 may be received.

On the basis of the application of the touch input, as illustrated in the third drawing of FIG. 8A, image information 35b corresponding to the one list 35a may be output on the touch screen 151. Here, the image information 35b may be image information stored in a state in which an input screen formed on the basis of the specific mode overlaps a specific image, for example. In this case, the control unit 180 may control the touch screen 151 such that an input screen in which a specific visual effect is applied to the specific image is output on the basis of the specific visual effect.

Also, the control unit 180 may control the touch screen 151 such that information 35c regarding an output time of the input screen included in the image information 35b is output to one region of the touch screen 151. Thus, the user may be provided with information regarding an output time of the input screen output on the basis of the specific visual effect.

Meanwhile, when storing image information corresponding to the preset input screen, the user may set security with respect to the image information. For example, the user may store the image information together with specific authentication information (for example, iris information or fingerprint information). In this case, the control unit 180 may determine whether to output the image information on the assumption that an authentication function is performed on the basis of the specific authentication information.

That is, in a case in which authentication information input by the user is identical to the specific authentication information, the control unit 180 may control the touch screen 151 to output the image information. However, in a case in which the authentication information input from the user is identical to the specific authentication information, the control unit 180 may control the touch screen 151 to output the image information. However, in a case in which the authentication information input from the user is not identical to the specific authentication information, the control unit 180 may control the touch screen 151 to limit outputting of the image information.

Also, the control unit 180 may limit displaying of a portion of pieces of image information with security set by the user in the list screen regarding the stored pieces of image information. That is, as illustrated in the first drawing of FIG. 8B, a list screen 35 regarding a plurality of pieces of image information may be output on the touch screen 151. Also, the plurality of pieces of image information included in the list screen 35 may be displayed on the basis of the same scheme.

In this state, when there is an output request regarding the pieces of image information with set security together with inputting of authentication information from the user, the control unit 180 may determine whether the authentication information input to correspond to the output request is identical to previously stored authentication information. Here, the output request may be application of a specific input through the microphone 122, while inputting fingerprint information to a portion of the main body of the mobile terminal 100 (rear input unit) as illustrated in the second drawing of FIG. 8B, for example.

In a case in which the input authentication information is identical to the previously stored authentication information, as illustrated in the third drawing of FIG. 8B, the control unit 180 may control the touch screen 151 such that only pieces of image information corresponding to the input authentication information are changed to the displayed screen 36.

In this manner, the user may selectively limit outputting of at least a portion of the pieces of image information formed on the basis of the specific mode by utilizing authentication information.

In the mobile terminal according to an embodiment of the present disclosure, when the microphone is activated in a specific manner and a preset input is applied to the microphone, a mode for receiving a touch and voice information formed by the user by applying a specific visual effect thereto may be executed. Also, the specific visual effect may be variously applied on the basis of the preset input applied through the microphone.

Thus, the user may form a memo to which various and funny visual effects are applied by variously applying the preset input.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a terminal body;
    a touch screen coupled to the terminal body;
    a microphone coupled to the terminal body and configured to receive an external input;
    a sensor configured to sense movement of the terminal body; and
    a controller configured to:
        activate the microphone in response to a specific movement of the terminal body sensed by the sensor;
        activate at least a portion of the touch screen such that the at least the portion of the touch screen is switched to an activated state in which visual information is displayed and activate a memo mode in response to the external input received via the activated microphone in a deactivated state in which lighting of the touch screen is turned off, wherein the external input comprises vibration of air having a preset pattern;
        determine strength of the external input by analyzing a degree of a change in the vibration of air corresponding to the external input;
        cause the touch screen to display a preset input screen having a size corresponding to the determined strength of the external input when the memo mode is activated such that the size of the preset input screen is different based on the strength of the external input; and
        cause the touch screen to display the preset input screen in response to the external input, the preset input screen displayed at a position corresponding to a point of the touch screen at which a touch input is received, wherein the external input is received via the activated microphone in a state in which the touch input is applied to the point of the touch screen.

2. The mobile terminal of claim 1,
    wherein the memo mode is a mode in which information, generated in response to at least one of a touch input applied to the touch screen or a voice input received via the microphone, is output.

3. The mobile terminal of claim 2, wherein:
    the memo mode is maintained in the activated state for a preset period of time; and
    the controller is further configured to cause the touch screen to display the generated information via the preset input screen.

4. The mobile terminal of claim 3, wherein the controller is further configured to cause the touch screen to:
    change at least one of a size or a transparency of the preset input screen over time; and
    terminate the displaying of the preset input screen when the preset period of time lapses.

5. The mobile terminal of claim 4, wherein the controller is further configured to cause the touch screen to continue the displaying of the preset input screen for the preset period of time, starting from a point in time at which a specific input is received, in response to the specific input that is received via the microphone before the preset period of time lapses.

6. The mobile terminal of claim 4, further comprising a memory,
    wherein the controller is further configured to:
        cause the touch screen to display the generated information on the preset input screen; and
        cause the memory to store image information corresponding to at least a portion of the preset input screen when a preset condition is met prior to the termination of the displaying of the preset input screen.

7. The mobile terminal of claim 6, wherein the preset condition is related to at least one of receiving a specific input via the microphone, a lapse of the preset period of time, or sensing a specific movement of the terminal body by the sensor.

8. The mobile terminal of claim 6, wherein the controller is further configured to cause the touch screen to:
    display the image information in response to a user input; and
    terminate the displaying of the image information when the preset period of time lapses.

9. The mobile terminal of claim 8, wherein:
the image information is specific image information stored with preset authentication information; and
the controller is further configured to:
- limit displaying of a portion of the specific image information; and
- cause the touch screen to display a remaining portion of the specific image information other than the portion of the specific image information in response to a specific input received via the microphone.

10. The mobile terminal of claim 1, wherein:
the vibration of air having the preset pattern is caused by a puff or breath of a user; and
the controller is further configured to adjust the size of the preset input screen based on a time duration for which the external input is received.

11. The mobile terminal of claim 3, wherein the controller is further configured to cause the touch screen to:
- display screen information; and
- display the preset input screen having a preset transparency on at least a portion of the screen information in an overlapping manner.

12. The mobile terminal of claim 11, wherein the controller is further configured to cause the touch screen to change a transparency of the portion of the touch screen in which the generated information is displayed when the generated information is displayed on the preset input screen.

13. The mobile terminal of claim 11, further comprising a memory,
wherein the controller is further configured to cause the memory to:
store image information corresponding to the preset input screen in response to a first type of user input; and
store image information corresponding to the preset input screen and at least a portion of the screen information in response to a second type of user input,
wherein the first and second type of user inputs are received via at least one of the microphone, the touch screen, or the sensor.

14. A method for controlling a mobile terminal, the method comprising:
sensing a specific movement of a terminal body of the mobile terminal;
activating a microphone of the mobile terminal in response to the sensed specific movement of the terminal body;
activating at least a portion of a touch screen such that the at least the portion of the touch screen is switched to an activated state in which visual information is displayed and activating a memo mode in response to an external input received via the activated microphone in a deactivated state in which lighting of the touch screen is turned off, the external input comprising vibration of air having a preset pattern;
determining strength of the external input by analyzing a degree of a change in the vibration of air corresponding to the external input;
displaying, on the touch screen, a preset input screen having a size corresponding to the determined strength of the external input when the memo mode is activated such that the size of the preset input screen is different based on the strength of the external input; and
displaying the preset input screen in response to the external input, the preset input screen displayed at a position corresponding to a point of the touch screen at which a touch input is received, wherein the external input is received via the activated microphone in a state in which the touch input is applied to the point of the touch screen.

15. The method of claim 14, wherein the memo mode is a mode in which information, generated in response to at least one of a touch input applied to the touch screen coupled to the terminal body or a voice input received via the microphone, is output.

16. The method of claim 15, further comprising:
displaying the generated information via the preset input screen; and
terminating the displaying of the preset input screen when a preset period of time lapses after the memo mode is activated.

17. The method of claim 16, further comprising changing at least one of a size or a transparency of the preset input screen over time within the preset period of time.

* * * * *